United States Patent
Yoo et al.

(10) Patent No.: US 10,002,451 B2
(45) Date of Patent: Jun. 19, 2018

(54) TEXT-BASED IMAGE RESIZING

(71) Applicant: QUALCOMM Incorporated, San Diego, CA (US)

(72) Inventors: Seungwoo Yoo, Sungnam (KR); Hee-Seok Lee, Seoul (KR); Jihoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 14/597,584

(22) Filed: Jan. 15, 2015

(65) Prior Publication Data
US 2016/0210768 A1 Jul. 21, 2016

(51) Int. Cl.
| | |
|---|---|
| *G06T 3/40* | (2006.01) |
| *G06T 11/60* | (2006.01) |
| *G06T 3/00* | (2006.01) |
| *G06K 9/32* | (2006.01) |
| *G09G 5/00* | (2006.01) |
| *H04N 1/387* | (2006.01) |

(52) U.S. Cl.
CPC ............ *G06T 11/60* (2013.01); *G06K 9/3258* (2013.01); *G06T 3/0012* (2013.01); *G06T 3/40* (2013.01); *G09G 5/00* (2013.01); *H04N 1/3875* (2013.01); *G06T 2210/22* (2013.01); *G09G 2320/0613* (2013.01); *G09G 2340/04* (2013.01); *G09G 2340/045* (2013.01); *G09G 2340/14* (2013.01)

(58) Field of Classification Search
None
See application file for complete search history.

(56) References Cited

U.S. PATENT DOCUMENTS

| | | | |
|---|---|---|---|
| 7,584,424 B2 * | 9/2009 | Hanechak | G06F 17/248 715/244 |
| 8,094,973 B2 | 1/2012 | Bernal et al. | |
| 8,542,926 B2 | 9/2013 | Panjwani et al. | |
| 8,922,582 B2 * | 12/2014 | Murrett | 345/619 |
| 2002/0120653 A1 | 8/2002 | Kraft et al. | |
| 2010/0231609 A1 | 9/2010 | Chatting et al. | |

(Continued)

OTHER PUBLICATIONS

Avidan, S., et al., "Seam Carving for Content-Aware Image Resizing," ACM Transactions on Graphics (TOG)—Proceedings of ACM SIGGRAPH 2007, vol. 26, No. 3, Jul. 2007, Article No. 10, 9 pgs.

(Continued)

*Primary Examiner* — Mark Zimmerman
*Assistant Examiner* — Yu-Jang Tswei
(74) *Attorney, Agent, or Firm* — Toler Law Group

(57) ABSTRACT

A method, which is performed by an electronic device, for resizing an image having text is disclosed. The method may include determining layout information of at least one text region in the image. The layout information may include at least one of a number, a size, a location, a shape, or a text density of the at least one text region in the image. The method may also select a seam carving operation, a cropping operation, or a scaling operation for the image based on the layout information, a size of the image, and a target image size. The selected operation may be performed to resize the image to the target image size based at least on one of the layout information, the size of the image, or the target image size. The resized image may include the at least one text region.

30 Claims, 12 Drawing Sheets

(56) References Cited

U.S. PATENT DOCUMENTS

| | | | |
|---|---|---|---|
| 2010/0292002 A1* | 11/2010 | Ward | G07F 17/3211 |
| | | | 463/30 |
| 2011/0206295 A1 | 8/2011 | Tokunaga et al. | |
| 2012/0063685 A1 | 3/2012 | Chamaret et al. | |
| 2012/0096344 A1 | 4/2012 | Ho et al. | |
| 2012/0288190 A1 | 11/2012 | Tang | |
| 2014/0056475 A1* | 2/2014 | Jang | G06K 9/18 |
| | | | 382/103 |
| 2014/0205206 A1* | 7/2014 | Datar | G06T 3/0012 |
| | | | 382/298 |
| 2015/0063700 A1* | 3/2015 | Soundararajan | G06K 9/18 |
| | | | 382/182 |
| 2015/0127340 A1* | 5/2015 | Epshteyn | G10L 15/26 |
| | | | 704/235 |
| 2015/0269135 A1* | 9/2015 | Kim | G06F 17/2276 |
| | | | 704/8 |

OTHER PUBLICATIONS

International Search Report and Written Opinion for International Application No. PCT/US2015/063814, ISA/EPO, dated Jul. 7, 2016, 22 pgs.
Chen, L., et al., "A Visual Attention Model for Adapting Images on Small Displays", Multimedia Systems, Oct. 2003, vol. 9, Issue 4, Springer, New York, NY, pp. 353-364.
Vaquero, D., et al., "A Survey of Image Retargeting Techniques", Proceedings of SPIE, Sep. 7, 2010; vol. 7798, SPIE, Bellingham, Wash, 15 pgs.

* cited by examiner

TEXT-BASED IMAGE RESIZING

FIELD OF THE DISCLOSURE

The present disclosure relates generally to processing an image, and more specifically, to resizing an image having text to a smaller size.

DESCRIPTION OF RELATED ART

Recently, the use of electronic devices such as smartphones, tablet computers, wearable computers, and the like has been increasing among consumers. These devices may provide a variety of functionalities such as data processing and communication, voice communication, web browsing, multimedia processing and display, etc. Additionally, such electronic devices may provide image capturing and processing capabilities to capture and process images such as photographs for display.

Images that are captured by conventional electronic devices often have various resolutions (e.g., 5312×2988 pixels, 3264×2448 pixels). The electronic devices may display such images in a resolution different from the resolutions of the captured images. For example, an electronic device may capture an image a resolution of 3264×2448 pixels and then scale the image to fit a resolution of a display screen, which may be smaller than the resolution of the captured image. Further, a plurality of images may be reduced to a resolution of a preview icon and displayed on the display screen to facilitate viewing and searching of the images by a user.

Electronic devices often capture or store images having text such as a document, a business card, street signs, etc. Such text in an image may be an object of interest for a user. When the image having such text is reduced in resolution and displayed on a display screen, the text in the displayed image may not be readily recognizable due to the reduced resolution. Further, when such image is reduced, the text in the image may not be properly preserved in the reduced image. For example, the image may be reduced in resolution by removing an outer portion of the image. If the outer portion includes text, the text in the image may be removed in the process so that the reduced image does not include the text.

SUMMARY OF THE INVENTION

The present disclosure provides methods and apparatus for selecting an image resizing operation for an image including at least one text portion based on layout information of the at least one text portion and resizing the image to a target image size by performing the selected image resizing operation.

According to one aspect of the present disclosure, a method, which is performed by an electronic device, for resizing an image having text is disclosed. The method may include determining layout information of at least one text region in the image. The layout information may include at least one of a number, a size, a location, a shape, or a text density of the at least one text region in the image. The method may also select a seam carving operation, a cropping operation, or a scaling operation for the image based on the layout information, a size of the image, and a target image size. The selected operation may be performed to resize the image to the target image size based at least on one of the layout information, the size of the image, or the target image size. The resized image may include the at least one text region. This disclosure also describes an apparatus, a device, a combination of means, and a computer-readable medium relating to this method.

According to another aspect of the present disclosure, an electronic device for resizing an image, which may have text, is disclosed. The electronic device may include a layout information determination unit configured to determine layout information of at least one text region in the image. The layout information may include at least one of a number, a size, a location, a shape, or a text density of the at least one text region in the image. The device may also include a resizing operation selection unit configured to select a seam carving operation, a cropping operation, or a scaling operation for the image based on the layout information, a size of the image, and a target image size. A resizing unit in the electronic device may be configured to perform the selected operation to resize the image to the target image size based at least on one of the layout information, the size of the image, or the target image size. The resized image may include the at least one text region.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
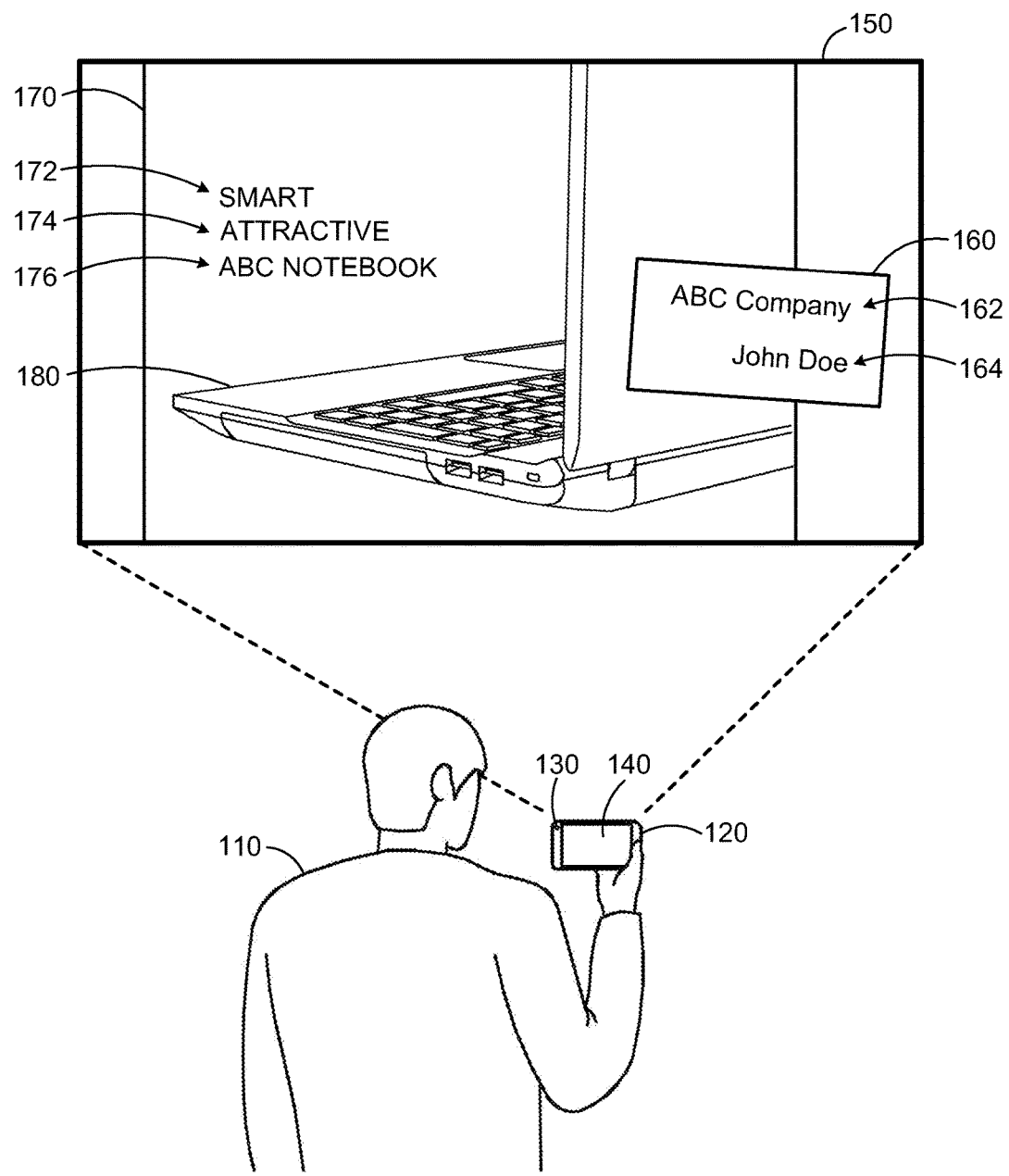
FIG. 1 illustrates an electronic device configured to capture an image on a display screen, according to one embodiment of the present disclosure.

FIG. 1 illustrates an electronic device 120 configured to display an image 150 on a display screen 140, according to one embodiment of the present disclosure. As shown, the image 150 may include a business card 160 and a portion of an advertisement 170 for a notebook computer 180. For example, a user 110 of the electronic device 120 may operate the electronic device 120 equipped with an image sensor 130 to capture the image 150 of the business card 160 and a portion of the advertisement 170 and access the captured image 150 for display on the display screen 140. Alternatively, the electronic device 120 may receive the image 150 from an external device through a communication network and display the image on the display screen 140.

In the illustrated embodiment, the image 150 may include a plurality of text portions 162, 164, 172, 174, and 176, each of which may include one or more character strings. As shown, the text portions 162 and 164 in the business card 160 may include character strings "ABC Company" and "John Doe," respectively. On the other hand, the text portions 172, 174, and 176 in the advertisement 170 may include character strings "SMART," "ATTRACTIVE," and "ABC NOTEBOOK," respectively. In addition, the captured image 150 may also include one or more non-text portions such as the notebook computer 180. As used herein, the term "text portion" may refer to any portion in an image that includes text and may include one or more characters, words, or strings of characters.

In the electronic device, the display screen 140 may have a display size or resolution of $N_1 \times M_1$ pixels. On the other hand, the image 150 may have an image size or resolution of $N_2 \times M_2$ pixels, which may be different from the display resolution of the display screen 140. When the size or resolution of the display screen in different from the size or resolution of the image 150, the electronic device 120 may resize the image 150 to fit the display size or resolution of the display screen 140 and display the resized image on the display screen 140. For example, if the display screen 140 has a display size or resolution of 1024×768 pixels and the image 150 has an image size or resolution of 2048×1536 pixels, the image 150 may be scaled down or resized to fit the display resolution of 1024×768 pixels for display. In this case, the image 150 may be scaled down or resized to the display size by maintaining an original aspect ratio of the image 150 or without maintaining the original aspect ratio.

Figure 2:
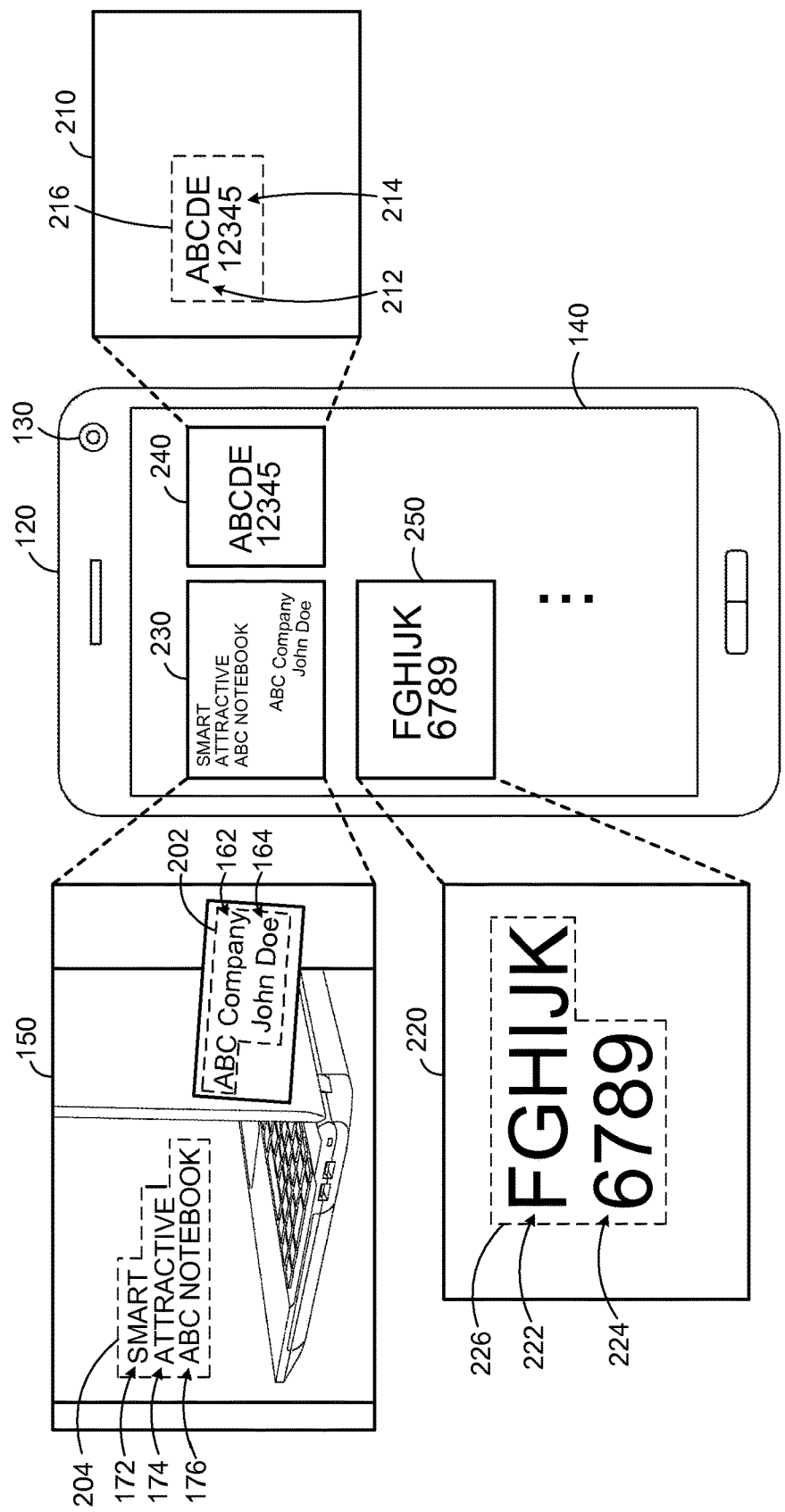
FIG. 2 shows the electronic device configured to access a plurality of images, each of which includes one or more text portions, and generate a plurality of thumbnail images (e.g., preview images) of the images, respectively, according to one embodiment of the present disclosure.

FIG. 2 shows the electronic device 120 configured to access a plurality of images 150, 210, and 220, each of which includes one or more text portions, and generate a plurality of thumbnail images 230, 240, and 250 (e.g., preview images) of the images 150, 210, and 220, respectively, according to one embodiment of the present disclosure. The electronic device 120 may store the images 150, 210, and 220, which may be captured by the electronic device 120 or received from an external device via a wireless communication network or a wired communication line. When an application configured to organize and display images such as photographs, pictures, screenshots, video clips, or the like is executed, the electronic device 120 may access and resize the images 150, 210, and 220 to a size of a thumbnail image. In this process, the electronic device 120 may generate the thumbnail images 230, 240, and 250 by resizing the images 150, 210, and 220, respectively, to include or preserve one or more text portions that may be detected in the images 150, 210, and 220. The generated thumbnail images 230, 240, and 250 may be stored in the electronic device 120 and/or displayed on the display screen 140.

In the illustrated embodiment, the thumbnail images 230, 240, and 250 may be resized to be smaller in size than the images 150, 210, and 220, respectively. As used herein, the term "thumbnail image" may refer to a reduced-size image or a smaller version of an original image and include any image indicative of or associated with the original image. The images 150, 210, and 220 may have a same size or resolution or different sizes or resolutions. Similarly, the thumbnail images 230, 240, and 250 may have a same size or resolution or different sizes or resolutions. The thumbnail images 230, 240, and 250 may be displayed on the display screen 140 to provide a preview of the images 150, 210, and 220, respectively, to facilitate access to and/or searching of the images 150, 210, and 220. When the thumbnail image 230, 240, or 250 is selected, the image 150, 210, or 220 associated with the selected thumbnail image may be displayed on the display screen 140, The electronic device 120 may be configured to generate the thumbnail images 230, 240, and 250 to include or preserve one or more text portions that may be detected in the images 150, 210, and 220, respectively. In one embodiment, the images 150, 210, and 220 may be accessed and one or more text portions may be detected in each of the images 150, 210, and 220. Upon detecting each of the text portions in the images 150, 210, and 220, the electronic device 120 may group or cluster a plurality of text portions into one or more text regions based on a similarity of at least one of stroke widths, sizes, shapes, or locations of the text portions in each image. For each of the images 150, 210, and 220, layout information indicative of a number, sizes, locations, shapes, and/or text densities of the text regions in the image may be determined.

As shown in FIG. 2, the electronic device 120 may identify a plurality of text regions 202, 204, 216, and 226 in the images 150, 210, and 220 by detecting and grouping a plurality of text portions having similar stroke widths, sizes, shapes, and/or locations. In the case of the image 150, the text portions 162 and 164 may be grouped as the text region 202 while the text portions 172, 174, and 176 may be grouped into the text region 204. For the image 210, the electronic device 120 may group the text portions 212 and 214 into the text region 216. In the image 220, the electronic device 120 may group the text portions 222 and 224 into the text region 226.

The electronic device 120 may resize the images 150, 210, and 220 to generate the thumbnail images 230, 240, and 250, respectively, by performing at least one of a seam carving operation, a cropping operation, or a scaling operation, each of which is adapted to include or preserve one or more text regions in each of the images 150, 210, and 220. For each of the images 150, 210, and 220, the electronic device 120 may select one of the seam carving operation, the cropping operation, and the scaling operation based on the layout information of the text regions in the image 150, 210, or 220. In one embodiment, the seam carving operation may be selected if layout information of an image is indicative of two or more separate text regions. As shown in FIG. 2, since the image 150 includes the text regions 202 and 204, the electronic device 120 may select and perform the seam carving operation for the image 150. In performing the seam carving operation, the electronic device 120 may resize the image 150 to fit the size of the thumbnail image 230 by removing a plurality of seams (e.g., paths of pixels) that are located in regions other than the text regions 202 and 204 in the image 150. The thumbnail image 230 may then be displayed on the display screen 140.

On the other hand, the electronic device 120 may select either the cropping operation or the scaling operation if layout information of an image is indicative of a single text region. In this case, the electronic device 120 may compare a size of the single text region with a size of the thumbnail image to be generated. If the size of the single text region is smaller than the size of the thumbnail image, the cropping operation may be selected and performed. Otherwise, the electronic device 120 may select and perform the scaling operation.

As shown in FIG. 2, since the image 210 includes the single text region 216 having a size smaller than or equal to a size of the thumbnail image 240, the electronic device 120 may select and perform the cropping operation. In the cropping operation, one or more portions outside the text region 216 in the image 210 may be selected and cropped to resize the image 210 to match the size of the thumbnail image 240. The resized image including the text region 216 may then be stored or displayed on the display screen 140 as the thumbnail image 240.

On the other hand, the image 220 may include the single text region 226 having a size larger than a size of the thumbnail image 250. Accordingly, the electronic device 120 may select and perform the scaling operation. In performing the scaling operation, the electronic device 120 may determine a scaling direction and a scaling ratio for the image 220 that are adapted to match the size of the thumbnail image 250 and to preserve the size of the text region 226 relative to other regions in the image 220. For example, the scaling direction may be determined to be along a diagonal direction and the scaling ratio may be determined to be 0.5 or 50%. The electronic device 120 may then resize the image 220 by scaling down the size of the image 220 according to the scaling direction and the scaling ratio. The resized image including the text region 226 may then be stored or displayed on the display screen 140 as the thumbnail image 250.

The electronic device 120 may resize an original image to a thumbnail image such that a ratio of the size or proportion of one or more text regions to a size or proportion of the remaining portions (e.g., non-text regions) is preserved or increased in the thumbnail image. In one embodiment, performing the seam carving operation and the cropping operation on an image may result in a thumbnail image with one or more text regions having a larger size or proportion relative to non-text regions. On the other hand, the scaling operation may at least preserve the ratio of the size or proportion of the text regions to the size of non-text regions. By preserving and/or increasing the relative size of text regions in the thumbnail image, it may enhance readability and/or recognition of the text regions by users.

In some embodiments, the electronic device 120 may select and perform two or more image resizing operations on an image. For example, the seam carving operation may initially be performed on an original image having two text regions to generate an interim image including the two text regions. If the interim image does not match a target image size of a thumbnail image, the electronic device 120 may perform the scaling operation on the interim image and generate the thumbnail image that has been scaled down from the interim image. In the case of an image having a single text region, the electronic device 120 may initially perform the cropping operation on the image to generate an interim image. If the interim image does not match a target image size of a thumbnail image, the scaling operation may then be performed to resize the interim image to the target image size of the thumbnail image. It should be appreciated that the electronic device 120 may also perform the seam carving operation, the cropping operation, and the scaling operation any suitable number of times and in any suitable order.

Figure 3:
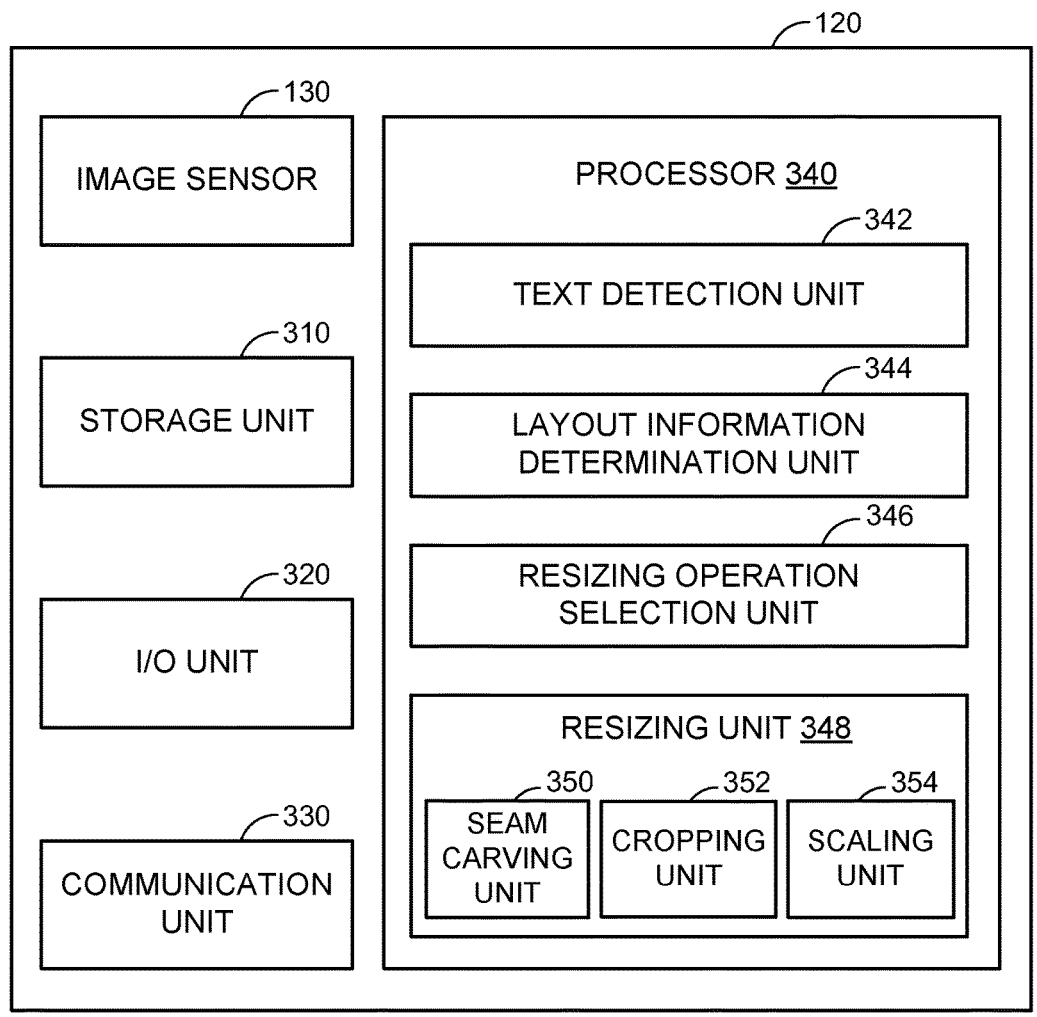
FIG. 3 shows a block diagram of the electronic device configured to select an image resizing operation for an image including at least one text portion and resize the image based on the selected image resizing operation, according to one embodiment of the present disclosure.

FIG. 3 shows a block diagram of the electronic device 120 configured to select an image resizing operation for an image including at least one text portion and resize the image based on the selected image resizing operation, according to one embodiment of the present disclosure. The electronic device 120 may include the image sensor 130, a storage unit 310, an I/O (input/output) unit 320, a communication unit 330, and a processor 340. As described herein, the electronic device 120 may be any suitable device equipped with an image processing capability such as a smartphone, a wearable computer (e.g., smart glasses, a smart watch, etc.), a digital camera (e.g., a DSLR camera), a personal computer, a laptop computer, a tablet computer, a gaming device, etc.

The image sensor 130 may capture one or more images that include one or more text portions. Additionally or alternatively, one or more images including one or more text portions may be received from an external device via the communication unit 330 through a wireless network or via the I/O unit 320 over a communication line. The images including the text portions may be stored in the storage unit 310 and accessed by the processor 340 for processing and/or display. For capturing the images, the image sensor 130 may employ any suitable image sensing or detecting devices such as a CCD (charge-coupled device), active pixel sensors based on CMOS (complementary metal-oxide-semiconductor) r NMOS (N-type metal-oxide-semiconductor) technologies, and the like. The image sensor 130 may capture one or more images and provide image data associated with the images to the processor 340 in the electronic device 120. In addition, the storage unit 310 may be implemented using any suitable storage or memory devices such as a RAM, a ROM, an EEPROM, a flash memory, an SSD, or the like.

The processor 340 may include a text detection unit 342, a layout information determination unit 344, a resizing operation selection unit 346, and a resizing unit 348. Further, the resizing unit 348 may include at least one of a seam carving unit 350, a cropping unit 352, or a scaling unit 354. The processor 340 may access one or more images having one or more text portions from the storage unit 310 and resize the images to a target image size. In one embodiment, the processor 340 may resize an image by accessing the image at or near the time the image is stored in the storage unit 310. Alternatively, the processor 340 may resize an image by accessing the image from the storage unit 310 when an application such as a photo gallery application is executed. As described herein, the processor 340 may be any processor or processing unit capable of processing images such as an application processor (AP), a central processing unit (CPU), a graphics processing unit (GPU), a microprocessor unit (MPU), or the like.

When the processor 340 accesses an image having one or more text portions from the storage unit 310, the text detection unit 342 may receive the image and detect at least one text portion in the image. For detecting each of the at least one text portion, a text portion in an image may be detected by determining one or more blobs for individual characters in the text portion. One or more blobs having one or more similar properties such as a color, intensity, proximity, and the like may be clustered into a blob cluster in a blob clustering operation. For example, a plurality of blobs having the same color and located in proximity of one another may be clustered into a blob cluster. A portion of the blob cluster that includes text or characters may then be extracted and detected as a text portion that includes text. In some embodiments, a line of text, a word, or a string of characters may be detected as a text portion. The text detection unit 342 may then provide the image and the detected text portions in the image to the layout information determination unit 344. For detecting text portions in an image, the text detection unit 342 may employ any suitable text detection schemes such as an edge based method, a connected-component based method, a texture based method, or the like.

The layout information determination unit 344 is configured to receive the image and the detected text portions and identify one or more text regions by grouping or clustering the text portions based on a similarity of at least one of stroke widths, sizes, shapes, or locations of the text portions in the image. For example, a plurality of neighboring text portions such as adjacent text lines (e.g., a sentence, a paragraph, etc.) or adjacent character strings (e.g., adjacent words) may be grouped or clustered into one text region. On the other hand, an isolated text portion may be identified as a single text region.

Upon identifying one or more text regions, the layout information determination unit 344 may determine layout information of the text regions in the image. In one embodiment, the layout information determination unit 344 may analyze the text regions in the image to determine physical layout information of the text regions including at least one of a number, sizes, locations, shapes, or text densities of the text regions in the image. Additionally or alternatively, the layout information determination unit 344 may recognize text in the text regions and determine logical layout information of the recognized text regions.

The logical layout information may be indicative of a priority or weight of each of the recognized text regions and may be determined based on a type of information and/or content of the recognized text in each of the text regions. As used herein, the term "a type of information" of a text region may be any information indicative of a type of text in the text region and may include names of persons, names of companies, names of organizations, phone numbers, e-mail addresses, titles of documents, or the like. Each of the types of information may be assigned a predetermined priority value or weight. If a name such as "John Doe" is recognized in a text region, the text region may be assigned a priority value or weight associated with the name. Similarly, if a text region is determined to be a text object such as a business card that includes a person's name, a company name, a phone number, etc., the text region may be given a priority value or weight associated with the business card. On the other hand, predetermined text or character strings may be assigned a predetermined priority value or weight. When the predetermined text or character strings are recognized in a text region, the text region may be assigned the predetermined priority value or weight. For example, text "ABC Company" may be predetermined to be of a high priority by a user of the electronic device 120. If a text region is determined to include the text "ABC Company," it may be given a high priority.

The resizing operation selection unit 346 may be configured to receive the image and the layout information for the image from the layout information determination unit 344 and select a seam carving operation, a cropping operation, or the scaling operation based on a size of the image, the layout information for the image, and a target image size (e.g., a thumbnail image size). The resizing operation selection unit 346 may select an image resizing operation based on the physical layout information of the text regions including at least one of a number, sizes, locations, shapes, or text densities of the text regions in the image. In one embodiment, when the layout information is indicative of two or more text regions, the seam carving operation may be selected.

On the other hand, if the layout information is indicative of a single text region, the cropping operation or the scaling operation may be selected. In this case, the resizing operation selection unit 246 may determine whether the text region may be included within the target image size based on the size and the shape of the text region. If the size and shape of the text region indicate that the text region may be included within the target image size, the cropping operation may be selected. Otherwise, the resizing operation selection unit 346 may select the scaling operation.

According to one embodiment, the resizing operation selection unit 346 may determine a ratio of the size of one or more text regions to the size of the image. If the ratio is determined to be greater than a predetermined ratio (e.g., 0.7 or 70%), the scaling operation may be selected. For example, if the ratio of the text regions to the size of the image is 0.9 or 90%, then the scaling operation may be selected. Otherwise, the cropping or the seam carving may be selected. In another embodiment, the resizing operation selection unit 346 may determine a text density of one or more text regions. For example, a number of characters in a text region may be divided by an area of the text region to determine a text density for the text region. If the text density is determined to be greater than a predetermined text density, the seam carving operation or the cropping operation may be selected.

Additionally or alternatively, the resizing operation selection unit 346 may select an image resizing operation based on the logical layout information of one or more text regions in the image. The logical layout information may be indicative of a priority or weight of each of the text regions and may be determined based on a type of information and/or content of the recognized text in each of the text regions. In one embodiment, if the logical layout information for one or more text regions is indicative of a low priority, the cropping operation or seam carving operation may be selected for cropping or carving the text regions having the low priority.

Upon selecting one of the resizing operations, the resizing operation selection unit 346 may select and activate the seam carving unit 350, the cropping unit 352, or the scaling unit 354 associated with the selected resizing operation. Upon activation, the selected resizing unit 350, 352, or 354 may receive the image, the layout information of the image, and the target image size, and resize the image based on the size of the image, the layout information, and the target image size. In one embodiment, the selected resizing unit 350, 352, or 354 may resize the image to the target image size or an interim image size, which may be larger than the target image size. If the resized image is larger than the target image size, the resized image may be provided to the layout information determination unit 344 for determining layout information as described above. The resizing operation selection unit 346 may then select another image resizing operation among the seam carving operation, the cropping operation, and the scaling operation, and select one of the seam carving unit 350, the cropping unit 352, and the scaling unit 354 associated with the selected resizing operation. The selected resizing unit 350, 352, or 354 may then further resize the interim image. This process may be repeated any suitable number of times to resize the image until the target image size is obtained.

The seam carving unit 350 is configured to receive the image, the layout information for the image, and the target image size from the resizing operation selection unit 346 and perform the seam carving operation on the image based on a size of the image, the layout information, and the target image size. During the seam carving operation, the seam carving unit 350 may determine a plurality of seams in the image, which includes one or more text regions. As used herein, the term "seam" may refer to a plurality of pixels in an image that may be connected or traversed along a path vertically between a top portion and a bottom portion of the image or horizontally between left and right sides of the image. Further, the term "seam carving operation" may refer to one or more operations or acts of resizing an image by determining a plurality of seams in an image and removing one or more seams from the image.

The seam carving unit 350 may be configured to calculate a plurality of energy values for a plurality of pixels in the image. Each of the energy values may be indicative of a probability that the associated pixel is text. For example, a plurality of pixels in the text regions may have higher energy values than a plurality of pixels in non-text regions. In one embodiment, the seam carving unit 328 may adjust the energy values for pixels associated with one or more text regions based on the logical layout information. For example, when the logical layout information is indicative a low priority for a specified text region, the energy values for the pixels in the specified text region may be decreased. The seam carving unit 350 may then determine a plurality of seams in the image based on the energy values of the pixels in the image. In this process, the seam carving unit 350 may determine a set of paths of pixels of minimum energy gradient or minimum entropy as the seams in the image.

Upon determining the seams, the seam carving unit 350 may calculate a total energy value (e.g., a sum of energy values) for pixels in each of the seams. For example, seams located in non-text regions may have lower total energy values than seams located in the text regions. The seam carving unit 350 may remove one or more of the seams based on the total energy values of the seams. In one embodiment, the number of the seams to be removed may be determined based on the size of the image and the target image size. For example, if an image having a size or resolution of 1024×768 pixels is resized to a target image size or resolution of 600×600 pixels, 424 vertical seams and 168 horizontal seams may be removed from the image. In this case, 424 vertical seams corresponding to 424 lowest total energy values may be removed from 1,024 vertical seams and 168 horizontal seams corresponding to 168 lowest total energy values may be removed from 768 horizontal seams. Additionally or alternatively, the seams may be removed based on a predetermined total threshold energy value. In the example above, if some of the 424 vertical seams have total threshold energy values exceeding the predetermined total threshold energy value, the seam carving unit 350 may not remove such seams from the image and provide the seam-carved image of an interim image size to the layout information determination unit 344 for determining layout information on the interim image and the resizing operation selection unit 346 for selecting another image resizing operation. Upon removing the seams from the image, the seam carving unit 350 may generate a resized image of the target image size. The resized image may be stored in the storage unit 310 and/or displayed on the I/O unit 320 such as a display screen.

The cropping unit 352 may be configured to receive the image, the layout information for the image, and the target image size from the resizing operation selection unit 346 and perform the cropping operation on the image based on a size of the image, the layout information, and the target image size. As used herein, the term "cropping operation" may refer to one or more operations or acts of resizing an image by cropping or removing one or more portions (e.g., pixels) of the image. The cropping unit 352 may identify one or more portions of the image (e.g., non-text regions) outside a text region in the image and crop or remove the portions from the image. A size of the portions to be cropped or removed may be determined based on the sizes of the image, the text region, and the target image. For example, if the sizes of the image, the text region, and the target image are 1024×768 pixels, 580×320 pixels, and 600×600 pixels, respectively, the cropping unit 352 may identify a portion in the image that includes the text region and has the same size as the target image size, i.e., 600×600 pixels, and crop one or more portions outside the identified portion from the image. If such a portion cannot be identified and a portion larger than the target image size is identified, the cropping unit 352 crop the one or more portions outside the identified portion and provide the cropped image of an interim image size to the layout information determination unit 344 and the resizing operation selection unit 346 for selecting another resizing operation. Upon cropping or removing the one or more portions, the cropping unit may generate a resized image of the target image size. The resized image may be stored in the storage unit 310 and/or displayed on the I/O unit 320 such as a display screen.

The scaling unit 354 may be configured to receive the image, the layout information for the image, and the target image size from the resizing operation selection unit 346 and perform the scaling operation on the image based on a size of the image, the layout information, and the target image size. As used herein, the term "scaling operation" may refer to one or more operations or acts of resizing an image by changing a dimension (e.g., a number of horizontal and vertical pixels) of the image in proportion to a dimension of a target image. In one embodiment, the scaling unit 354 may scale the image to the target image based on the size of the image and the target image size. Additionally or alternatively, the scaling unit 354 may determine one or more scaling directions (e.g., a horizontal direction, a vertical direction, and a diagonal direction) and a scaling ratio based on the size of the image and the target image size. For example, if the sizes of the image and the target image are 2048×1536 pixels and 1024×768 pixels, respectively, the scaling unit 354 may determine the diagonal direction and 0.5 or 50% as the scaling direction and the scaling ratio, respectively. Upon determining the scaling direction and the scaling ratio, the scaling unit 354 may scale the image to the target image size.

In one embodiment, the scaling unit 354 may scale an image using any suitable image scaling schemes such as bilinear interpolation, bicubic interpolation, nearest neighbor interpolation, and the like. For example, given an original image having 2048×1536 pixels and a target image having 1024×768 pixels, the pixels in the original image may be sampled and interpolated to generate 1024×768 pixels as the target image. Each of the pixels in the target image may be generated by interpolating a set of selected pixels in the original image based on distances between the pixel in the target image and the selected pixels in the original image. The set of pixels may be 2×2 pixels in the case of bilinear interpolation or 4×4 pixels in the case of bicubic interpolation. In the case of nearest neighbor interpolation, the scaling unit 354 may sample the 2048×1536 pixels in the original image and select 1024×768 pixels as the target image from the 2048×1536 pixels by determining, for each of the pixel locations in the target image, a pixel in the original image that is nearest to the pixel location.

When the image is resized to the target image size, a text density of a text region in the image characterized by a number of characters in the area of the text region may increase due to a decrease in the area of the text region in the resized image. In this case, the scaling unit 354 may determine whether the text density of the text region is larger than a predetermined text density. If the text density of the text region is determined to be larger than the predetermined text density, the scaling unit 354 may scale the image until the text density of the text region reaches the predetermined text density and may provide the scaled image of an interim image size to the layout information determination unit 344 for determining layout information on the interim image and the resizing operation selection unit 346 for selecting another resizing operation. In this manner, the scaling unit 354 may scale the image to generate the resized image of the target image size. The resized image may be stored in the storage unit 310 and/or displayed on the I/O unit 320 such as a display screen.

Figure 4:
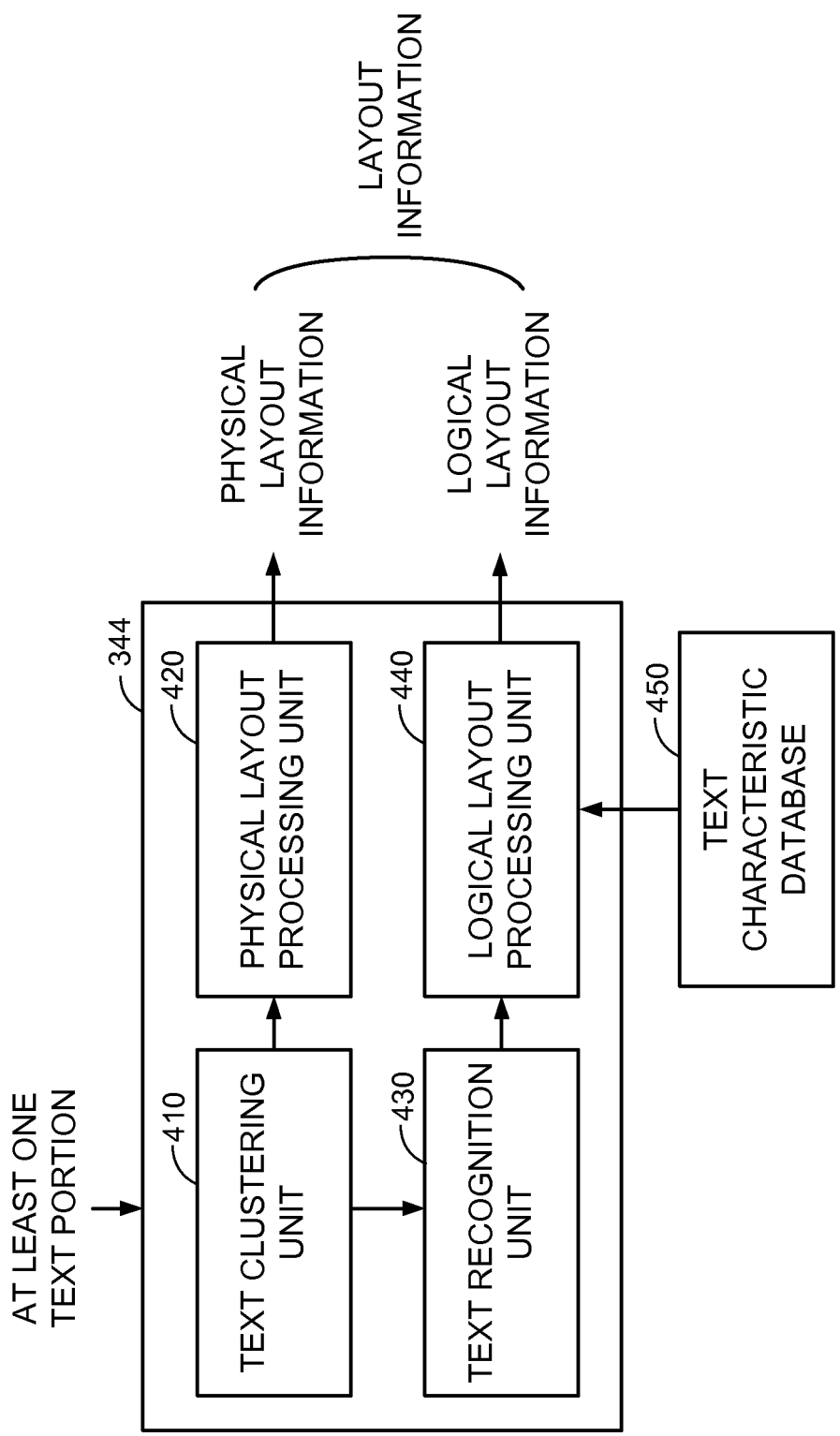
FIG. 4 illustrates a block diagram of a layout information determination unit configured to receive at least one text portion and determine layout information of at least one text region including the at least one text portion, according to one embodiment of the present disclosure.

FIG. 4 illustrates a block diagram of the layout information determination unit 344 configured to receive at least one text portion and determine layout information of at least one text region including the at least one text portion, according to one embodiment of the present disclosure. The layout information may be provided to the resizing operation selection unit 346 for use in selecting an image resizing operation. As shown, the layout information determination unit 344 may include a text clustering unit 410, a physical layout processing unit 420, a text recognition unit 430, and a logical layout processing unit 440.

The text clustering unit 410 may be configured to group or cluster a plurality of text portions having the same or similar properties into a text region. In one embodiment, one or more text portions having the same or similar stroke widths, sizes, shapes, and/or locations may be grouped or clustered into a text region. In this case, the text region may be in any suitable shape (e.g., a rectangular shape, a polygon shape, or the like) to include the text portions. The text clustering unit 410 may then provide the at least one text region in the image to the physical layout processing unit 420 and the text recognition unit 430.

Upon receiving the at least one text region from the text clustering unit 410, the physical layout processing unit 420 may determine physical layout information of the text region. The physical layout information may be associated with a structure or an appearance of the at least one text region in the image. In one embodiment, the physical layout processing unit 420 may analyze the text region to determine a number, a size, a location, a shape, and/or a text density of the text region. At least one of the number, the size, the location, the shape, or the text density may be used as the physical layout information in selecting and performing the seam carving operation, the cropping operation, or the scaling operation to resize the image.

The text recognition unit 430 may be configured to receive the at least one text region from the text clustering unit 410 and recognize text in the at least one text region. According to one embodiment, each character in the text region, which may include a letter, a number, or a symbol, may be recognized. In addition, one or more words, phrases, or number sequences may be determined based on the recognized characters. In recognizing the text, the text recognition unit 430 may use any suitable text recognition methods such as OCR (Optical Character Recognition) and the like. The recognized text in the at least one text region may be provided to the logical layout processing unit 440.

The logical layout processing unit 440 may be configured to determine logical layout information of the text region. The logical layout information may be related to context or a user's preference for the recognized text in the at least one text region. In one embodiment, the logical layout processing unit 440 may determine a priority or weight of the at least one text region based on the recognized text in the at least one text region, which is received from the text recognition unit 430. For each of the at least one text region, the logical layout processing unit 440 may determine a type of information and content based on the recognized text in the text region. The priority for the text region may be then determined based on the type of information and/or the content of the text region.

In determining the type of information, the logical layout processing unit 440 may access a text characteristic database 450 that may be included in the storage unit 310 to refer to text characteristic information (e.g., phone numbers, e-mail addresses, addresses, people's names, shop names, company names, CIs (corporate identities), URLs (uniform resource locators)). Based on the text characteristic information, the logical layout processing unit 440 may determine the type of information associated with the recognized text. For example, the text characteristic information on phone numbers may include typical formats of phone numbers and/or typical descriptive words such as "PHONE," "MOBILE," "OFFICE," "HOME," "NUMBER," etc. If the recognized text in the text region includes a sequence of numbers indicating one of the typical formats of phone numbers and/or character strings such as "PHONE" and "NUMBER," the type of information for the text region may be determined to be a phone number. Types of information such as names of persons, entities, and objects may be assigned predetermined priority values or weights. In the example above, the text region may be assigned a priority value or weight associated with the phone number.

The logical layout processing unit 440 may determine whether the recognized text in the text region matches a predetermined text or character strings. The predetermined text or character strings may be assigned a predetermined priority value or weight. When the logical layout processing unit 440 determines that text recognized in a text region matches the predetermined text or character strings, the text region may be assigned the predetermined priority value or weight associated with the recognized text. For example, a text region is determined to include the text "John Doe" that may be predetermined to be of a high priority by a user of the electronic device 120, the text region may be given a high priority. The priority or weight of the at least one text region may be used in selecting and performing the seam carving operation, the cropping operation, or the scaling operation to resize the image. As described, the physical layout information determined by the physical layout processing unit 420 and the logical layout information determined by the logical layout processing unit 440 may be used as the layout information in selecting and performing an image resizing operation on the image.

Figure 5:
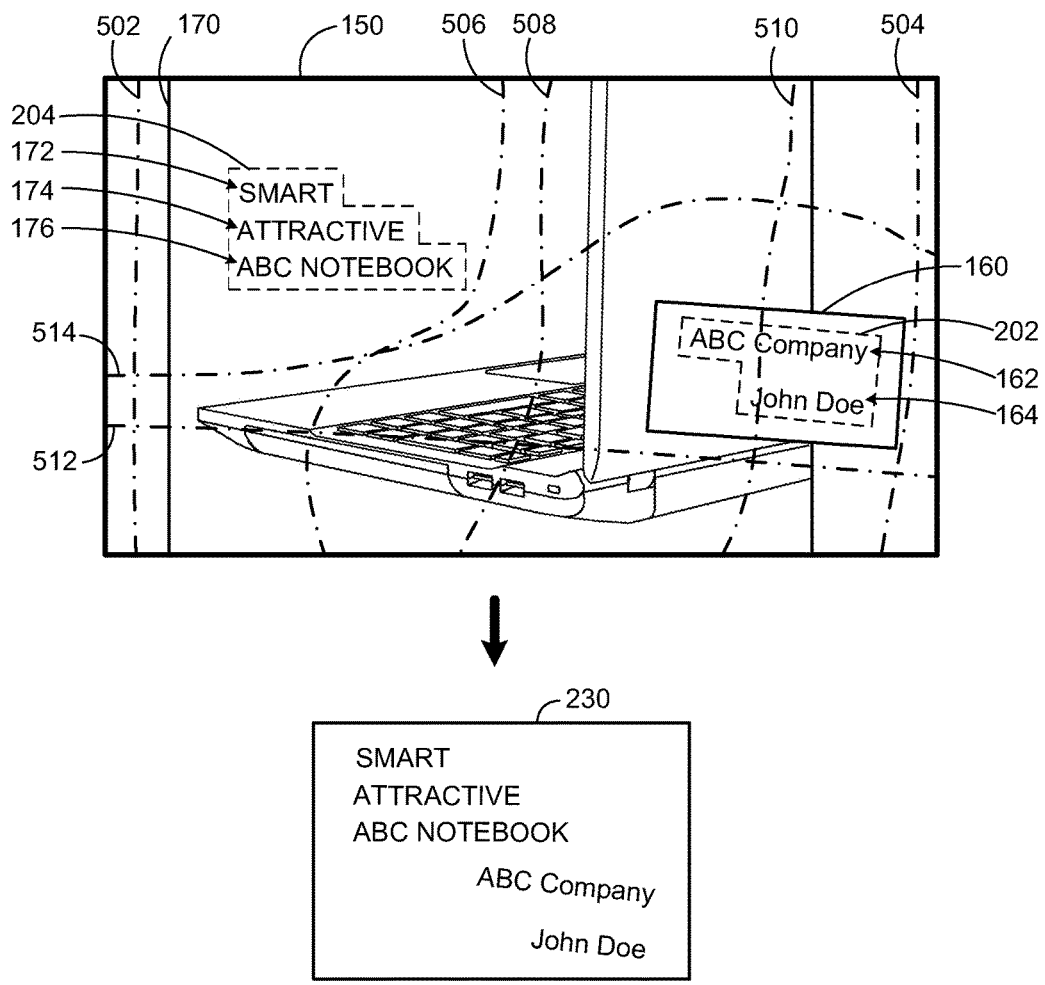
FIG. 5 illustrates selecting and performing a seam carving operation for an image to generate a thumbnail image of the image, according to one embodiment of the present disclose.

FIG. 5 illustrates selecting and performing the seam carving operation for the image 150 to generate the thumbnail image 230, according to one embodiment of the present disclose. The image 150 may include the text portions 162 and 164 in the business card 160 and the text portions 172, 174, and 176 in the advertisement 170. The text detection unit 342 in the processor 340 may detect the text portions 162, 164, 172, 174, and 176 in the image 150.

The layout information determination unit 344 may group or cluster the text portions 162, 164, 172, 174, and 176 into the text regions 202 and 204. For example, the layout information determination unit 344 may determine that the text portions 162 and 164 are adjacent to each other and have similar sizes and shapes and group or cluster the text portions 162 and 164 into the text region 202. Similarly, the text portions 172, 174, and 176 may be determined to be adjacent to each other and have similar sizes and grouped or clustered into the text region 204.

Upon identifying the text regions 202 and 204, the layout information determination unit 344 may generate physical layout information for the text regions 202 and 204 based at least on one of a number, sizes, locations, shapes, or text densities of the text regions 202 and 204. The layout information determination unit 344 may also generate logical layout information for each of the text regions 202 and 204 that includes at least one of a type of information or content of the text region. In this process, the text "ABC Company" and "John Doe" in the text region 202 and the text "SMART," "ATTRACTIVE," and "ABC NOTEBOOK" in the text region 204 may be recognized. Based on the recognized text, the logical layout processing unit 440 may determine that the text region 202 is associated with a company name and a person's name while the text region 204 is associated with a company name. In the illustrated embodiment, the logical layout information for the text regions 202 and 204 may be indicative of a same or similar priority or weight for the text regions 202 and 204.

The resizing operation selection unit 346 may select the seam carving operation for resizing the image 150 into the thumbnail image 230 based on the image 150, a target image size (i.e., a size of the thumbnail image 230), and the physical layout information and/or the logical layout information of the text regions 202 and 204. In the illustrated embodiment, the resizing operation selection unit 346 may determine that the physical layout information is indicative of two text regions. Additionally or alternatively, the physical layout information may indicate that a ratio of a combined size of the text regions 202 and 204 to the size of the image 150 is smaller than a predetermined ratio (e.g., 0.7 or 70%). Based on the physical layout information, the resizing operation selection unit 346 may select the seam carving operation and activate the seam carving unit 350 to perform the seam carving operation.

The seam carving unit 350 may receive the image 150, the physical layout information, the logical layout information, and the size of the thumbnail image 230 and perform the seam carving operation on the image 150. For each of a plurality of pixels in the image 150, an energy value indicative of a probability that the associated pixel is text may be calculated. As shown, the pixels in the text regions 202 and 204 may have higher energy values than the pixels outside the text regions 202 and 204. The seam carving unit 350 may then determine a plurality of seams for the image 150 including a plurality of vertical seams 502, 504, 506, 508, and 510 and a plurality of horizontal seams 512 and 514. In determining each of the seams, the seam carving unit 350 may determine a set of pixels starting from a pixel on one side of the image 150 toward the other side of the image 150 along a path of minimum energy gradient or minimum entropy. In this manner, the plurality of seams starting from a plurality of pixels in the image may be determined. Although the vertical seams 502, 504, 506, 508, and 510 and the horizontal seams 512 and 514 are illustrated, the seam carving unit 350 may determine any number of vertical and/or horizontal seams suitable for the image. For example, if an image has an N×M resolution or pixels, N number of vertical seams and M number of horizontal seams may be generated.

In the illustrated embodiment of FIG. 5, the image 150 may have a size of 1024×768 pixels, which may be resized to the target image size of 400×400 pixels. In this case, 1,024 vertical seams and 768 horizontal seams may be determined for the image 150. Upon generating the seams, the seam carving unit 350 may resize the image 150 to the target image size of the thumbnail image 230 by selecting and removing 624 vertical seams and 368 horizontal seams based on total energy values of the seams. In this case, 624 vertical seams including the seams 502, 504, 506, and 508 that correspond to 624 lowest total energy values and 368 horizontal seams including the seams 512 and 514 that correspond to 368 lowest total energy values may be selected and removed from the image 150.

Since energy values of pixels are indicative of a probability that the associated pixels are text, seams having lowest total energy values that are selected and removed may not correspond to the text regions 202 and 204. Accordingly, the text regions 202 and 204 may be preserved during the seam carving operation. For example, the seam 510 may have a high total energy value and thus may not be removed from the image 150. Upon removing the selected seams from the image 150, the seam carving unit 350 may provide the resized image having the target image size as the thumbnail image 230 including the text regions 202 and 204.

Figure 6:
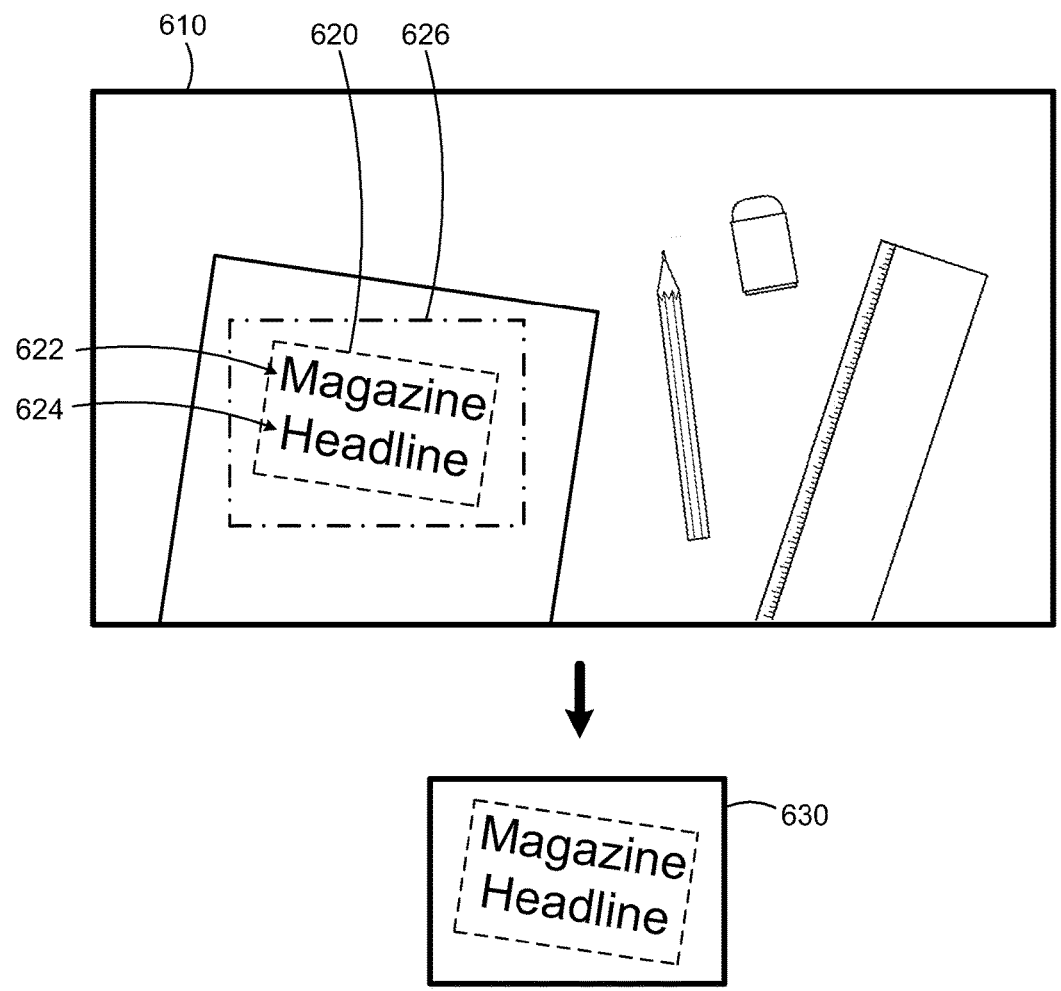
FIG. 6 shows performing a cropping operation for an image to generate a thumbnail image of the image, according to one embodiment of the present disclose.

FIG. 6 shows performing a cropping operation for an image 610 to generate a thumbnail image 630, according to one embodiment of the present disclose. As shown, the image 610 may include a text region 620, and the text region 620 may include a plurality of text portions 622 and 624. In this embodiment, the cropping unit 352 may perform the cropping operation on the image 610 based on the image 610, the target image size (i.e., a size of the thumbnail image 630), and the physical layout information and/or the logical layout information of the text region 620.

The physical layout information may include a number, a size, a location, a shape, and a text density of the text region

620. In the illustrated embodiment, the physical layout information for the text region 620 may be indicative of one text region. In addition, the physical layout information for the text region 620 may indicate that a size of the text region 620 is smaller than the target image size and that a ratio of the size of the text region 620 to the size of the image 610 is smaller than a predetermined ratio (e.g., 0.7 or 70%). On the other hand, the logical layout information may be indicative of a priority or a weight for the text region 620 and may include at least one of a type of information or content of the text region 620.

The cropping unit 352 may perform the cropping operation to resize the image 610 including the text region 620 to the target image size. In one embodiment, the image 610 may have a size of 1024×768 pixels, and the target image size of the thumbnail image 630 may be 400×400 pixels. The cropping unit 352 may identify a portion 626 in the image 610 that includes the text region 620 and has the same size as the target image size, i.e., 400×400 pixels, and crop one or more portions outside the portion 626 from the image 610. Upon cropping or removing the one or more portions, the cropping unit 352 may generate the resized image having the target image size as the thumbnail image 630 including the text region 620.

Figure 7:
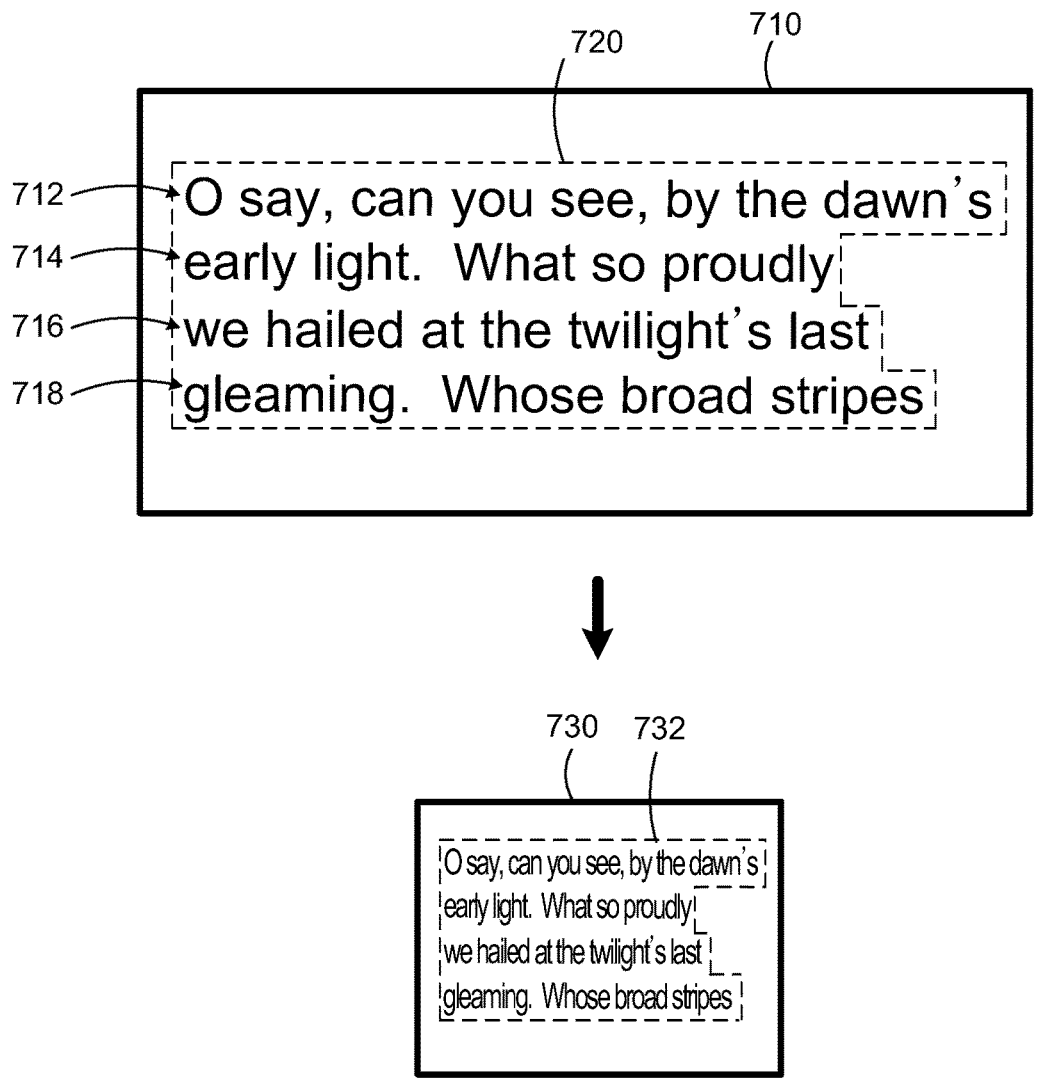
FIG. 7 illustrates a scaling operation for an image to generate a thumbnail image of the image, according to one embodiment of the present disclose.

FIG. 7 illustrates a scaling operation for an image 710 to generate a thumbnail image 730, according to one embodiment of the present disclose. As illustrated, the image 710 may include a single text region 720, and the text region 720 may include a plurality of text portions 712, 714, 716, and 718. In this embodiment, the scaling unit 354 may perform the scaling operation on the image 710, which includes the text region 720, based on the image 710, the target image size (i.e., a size of the thumbnail image 730), and the physical layout information and/or the logical layout information of the text region 720.

The physical layout information may include a number, a size, a location, a shape, and a text density of the text region 720. In the illustrated embodiment, the physical layout information for the text region 720 may indicate that a size of the text region 720 is larger than the target image size. In addition, the physical layout information for the text region 720 may indicate that a ratio of the size of the text region 720 to the size of the image 710 is larger than a predetermined ratio (e.g., 0.7 or 70%). On the other hand, the logical layout information may be indicative of a priority or a weight for the text region 720 and may include at least one of a type of information or content of the text region 720.

The scaling unit 354 may perform the scaling operation to resize the image 710 to the target image size. In one embodiment, the image 710 may have a size of 1000×600 pixels, and the target image size of the thumbnail image 730 may be 400×400 pixels. To scale the image 710 to the target image size, the scaling unit 354 may determine both of a horizontal direction and a vertical direction as scaling directions. A ratio of 0.4 or 40% as a scaling ratio may be determined for the horizontal direction while a ratio of 0.67 or 67% as a scaling ratio may be determined for the vertical direction. Based on the scaling directions and the ratio for each of the scaling directions, the scaling unit 354 may scale the image 710 to the target image size by interpolating the pixels in the image 710 using any suitable scheme such as bilinear interpolation, bicubic interpolation, nearest neighbor interpolation, etc. Upon interpolating the pixels in the image 710, the scaling unit 354 may generate the resized image having the target image size as the thumbnail image 730 including a text region 732.

Figure 8:
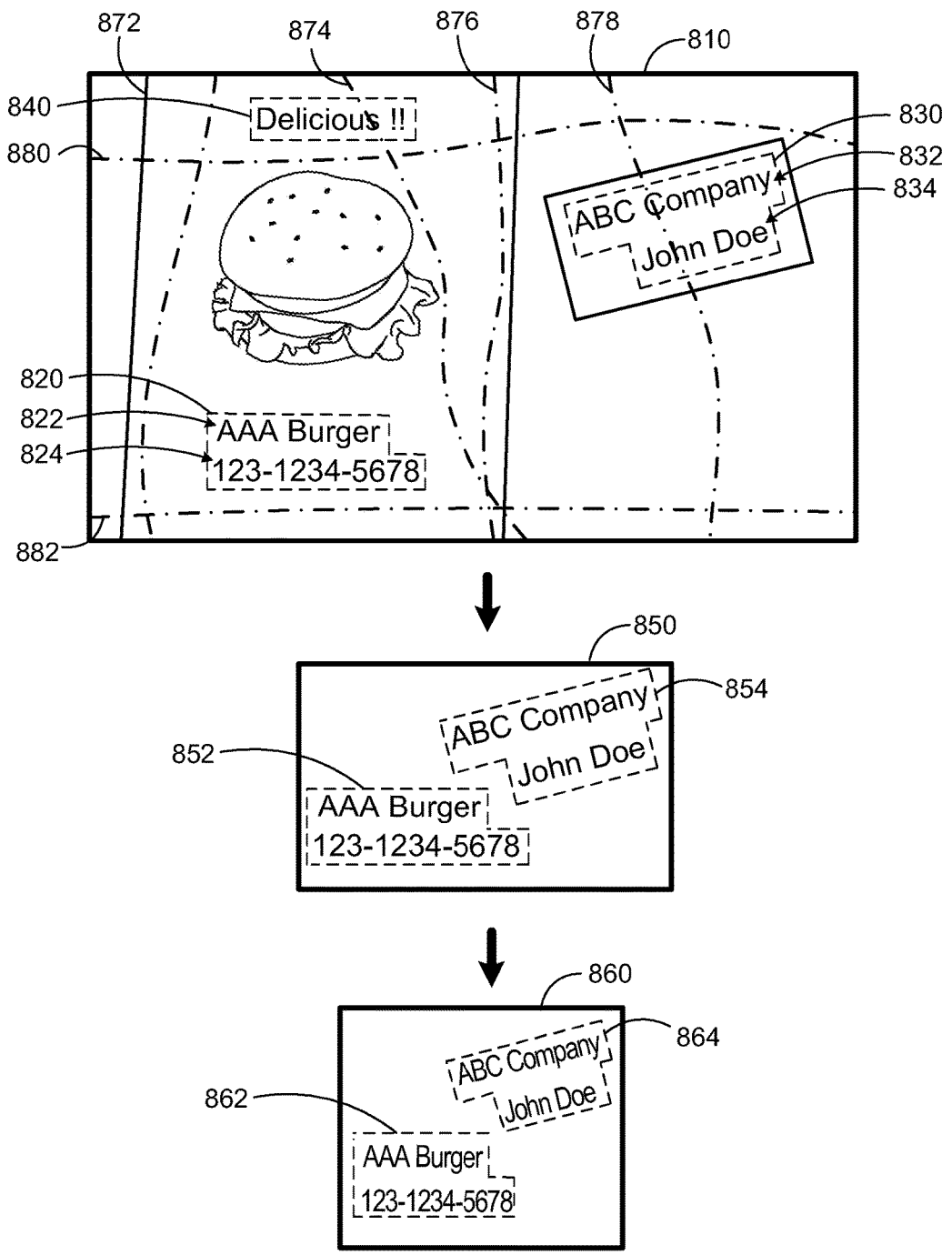
FIG. 8 shows performing a seam carving operation on an image to generate an interim image and performing a scaling operation on the interim image to generate a thumbnail image of a target image size, according to one embodiment of the present disclosure.

FIG. 8 shows performing a seam carving operation on an image 810 to generate an interim image 850 and performing a scaling operation on the interim image 850 to generate a thumbnail image 860 of a target image size, according to one embodiment of the present disclosure. As shown, the image 810 may include a plurality of text regions 820, 830, and 840. The text region 820 may include a plurality of text portions 822 and 824 while the text region 830 may include a plurality of text portions 832 and 834.

The seam carving unit 350 may perform the seam carving operation on the image 810, which includes the plurality of text regions 820, 830, and 840, based on the image 810, the target image size (i.e., a size of the thumbnail image 860), and the physical layout information and/or the logical layout information of the text regions 820, 830, and 840. The physical layout information may include a number, sizes, locations, shapes, and text densities of the text regions 820, 830, and 840 while the logical layout information may include at least one of a type of information or content of each of the text regions 820, 830, and 840, which is indicative of a priority or a weight for each of the text regions 820, 830, and 840. In the illustrated embodiment, the logical layout information for the text region 840 may indicate a low priority or weight for recognized text "Delicious!!" in the text region 840. On the other hand, high weights or priorities may be associated with the text regions 820 and 830 that include names and/or a phone number.

The seam carving unit 350 may calculate a plurality of energy values for a plurality of pixels in the image 810. Each energy value may be indicative of a probability that the associated pixel is text. Based on the logical layout information indicative of high priorities for the text regions 820 and 830 and a low priority for the text region 840, the seam carving unit 328 may increase the energy values for pixels associated with the text regions 820 and 830 and decrease the energy values for pixels associated with the text region 840. Upon calculating the energy values for the pixels in the image 810, a plurality of vertical seams such as seams 872, 874, 876, and 878 and a plurality of horizontal seams such as a seam 880 and 882 may be determined in the image 810. For resizing the image 810 having a size of 1024×768 pixels to a target image size of 400×400 pixels, 624 vertical seams and 368 horizontal seams having lowest total energy values less than a predetermined total threshold energy value may need to be removed from the image 810.

In the illustrated embodiment, 600 vertical seams in the image 810 may have total threshold energy values greater than or equal to the predetermined total threshold energy value and thus may not be removed. On the other hand, 424 vertical seams in the image 810 may correspond to 424 lowest total energy values that are less than the predetermined total threshold energy value, and thus may be removed from the image 810. Accordingly, the seam carving unit 350 may remove the 424 vertical seams from the image 810. On the other hand, 368 horizontal seams in the image 810 may have lowest total energy values less than the predetermined total threshold value and may be removed from the image 810.

As shown in FIG. 8, the seam carving unit 350 may remove 424 vertical seams including the vertical seams 872, 874, and 876 and 368 horizontal seams including the horizontal seams 880 and 882 from the image 810. In this case, the vertical seam 878 having a total energy value greater than or equal to the predetermined total threshold may not be removed from the image 810. Upon removing the selected seams, the seam carving unit 350 may generate the interim image 850 having a size (e.g., 600×400) that is larger than the target image size (e.g., 400×400). The interim image 850 including text regions 852 and 854 corresponding to the text regions 820 and 830 may then be provided to the layout information determination unit 344 and the resizing operation selection unit 346 for selecting another resizing operation.

Upon receiving the interim image 850 including the text regions 852 and 854, the layout information determination unit 344 may determine physical layout information indicative of a number, a size, a location, a shape, and a text density of the text regions 852 and 854 in the interim image 850. The resizing operation selection unit 346 may receive the interim image 850 and the physical layout information and determine that a combined size of the text regions 852 and 854 is larger than the target image size. Accordingly, the resizing operation selection unit 346 may select the scaling operation between the scaling operation and the cropping operation and select the scaling unit 354 for performing the scaling operation on the interim image 850.

The scaling unit 354 may receive the interim image 850, the physical layout information, and the target image size and perform the scaling operation to resize the interim image 850 to the target image size. In the illustrated embodiment, the interim image 850 has a size of 600×400 pixels while the target image size of the thumbnail image 860 is 400×400 pixels. For scaling the interim image 850 to the target image size, the scaling unit 354 may determine a horizontal direction as a scaling direction and a ratio of 0.66 or 66% as a scaling ratio. Based on the scaling direction and the scaling ratio, the scaling unit 354 may scale the interim image 850 to the target image size by interpolating the pixels in the interim image 850 and generate the thumbnail image 860 of the target image size including text regions 862 and 864 corresponding to the text regions 852 and 854.

Figure 9:
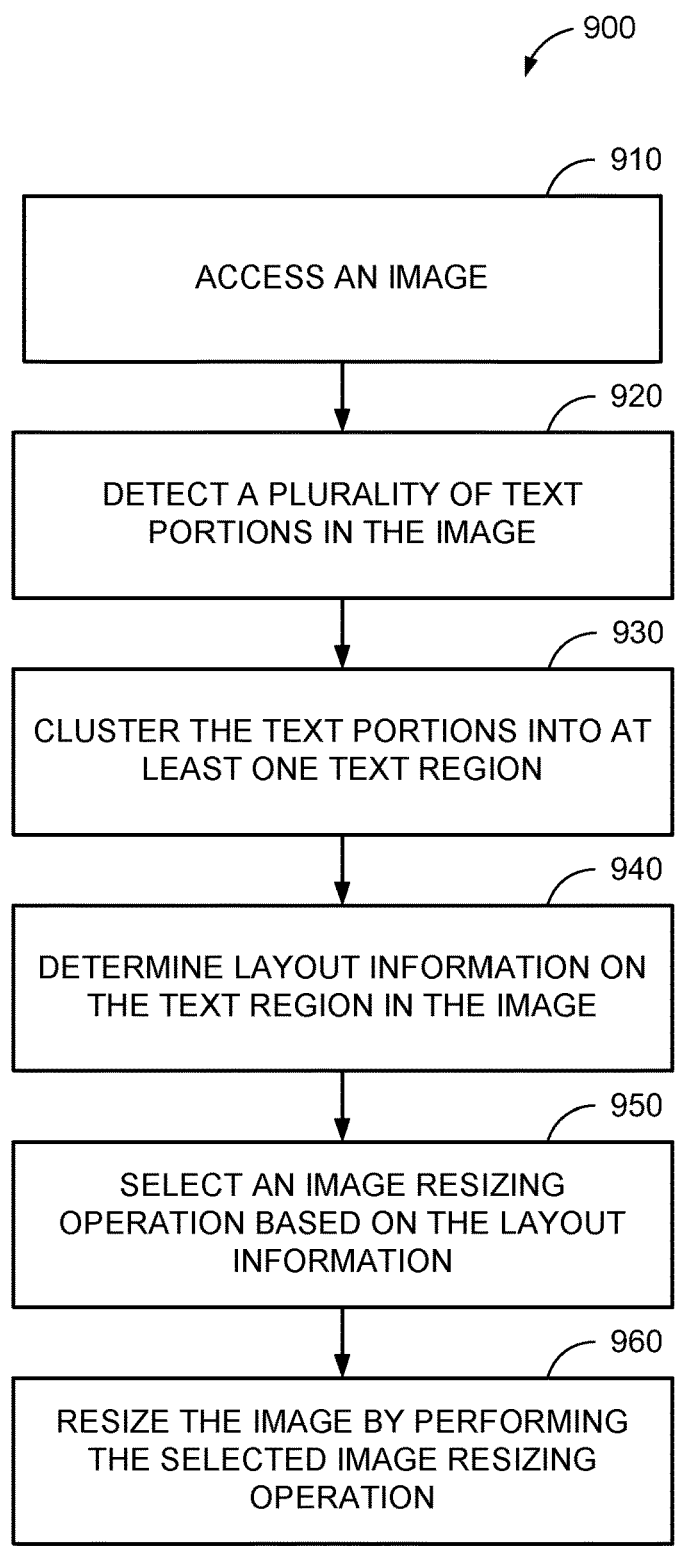
FIG. 9 illustrates a flowchart of a method for selecting an image resizing operation for an image and resizing the image in the electronic device based on the selected image resizing operation, according to one embodiment of the present disclosure.

FIG. 9 illustrates a flowchart of a method 900 for selecting an image resizing operation for an image and resizing the image in the electronic device 120 based on the selected image resizing operation, according to one embodiment of the present disclosure. The electronic device 120 may access an image including a plurality of text portions from the storage unit 310 to resize the image to a target image size, at 910. Once the image is accessed, the text detection unit 342 may detect the text portions in the image, at 920. The detected text portions may be clustered into at least one text region in the image by the text clustering unit 410 in the layout information determination unit 344, at 930. In one embodiment, a plurality of neighboring text portions such as adjacent text lines (e.g., a sentence, a paragraph, etc.) or adjacent character strings (e.g., adjacent words) may be clustered into one text region.

The layout information determination unit 344 may determine layout information of the text region in the image, at 940. In one embodiment, the layout information determination unit 344 may analyze the text region in the image to determine physical layout information of the text region including at least one of a number, a size, a location, a shape, or a text density of the text region in the image. Additionally or alternatively, the layout information determination unit 344 may recognize text in the text region and determine logical layout information of the recognized text which may be indicative of a priority of the recognized text.

Once the layout information is determined, the resizing operation selection unit 346 may select an image resizing operation for resizing the image, at 950. The resizing operation selection unit 346 may select the seam carving operation, the cropping operation, or the scaling operation based on the layout information for the image, a size of the image, and a target image size (e.g., a thumbnail image size). Upon selecting the image resizing operation, the seam carving unit 350, the cropping unit 352, or the scaling unit 354 may resize the image to the target image size by performing the selected image resizing operation, at 960.

If the seam carving operation is selected, the seam carving unit 350 may be activated and resize the image by performing the seam carving operation on the image. On the other hand, if the cropping operation is selected, the cropping unit 352 may be activated and resize the image by performing the cropping operation on the image. Otherwise, if the scaling operation is selected, the scaling unit 354 may be activated and resize the image by performing the scaling operation on the image. According to one embodiment, when the seam carving unit 350, the cropping unit 352, or the scaling unit 354 generates the resized image of the target image size, the resized image may be stored in the storage unit 310 and/or displayed on the I/O unit 320 such as a display screen.

Figure 10:
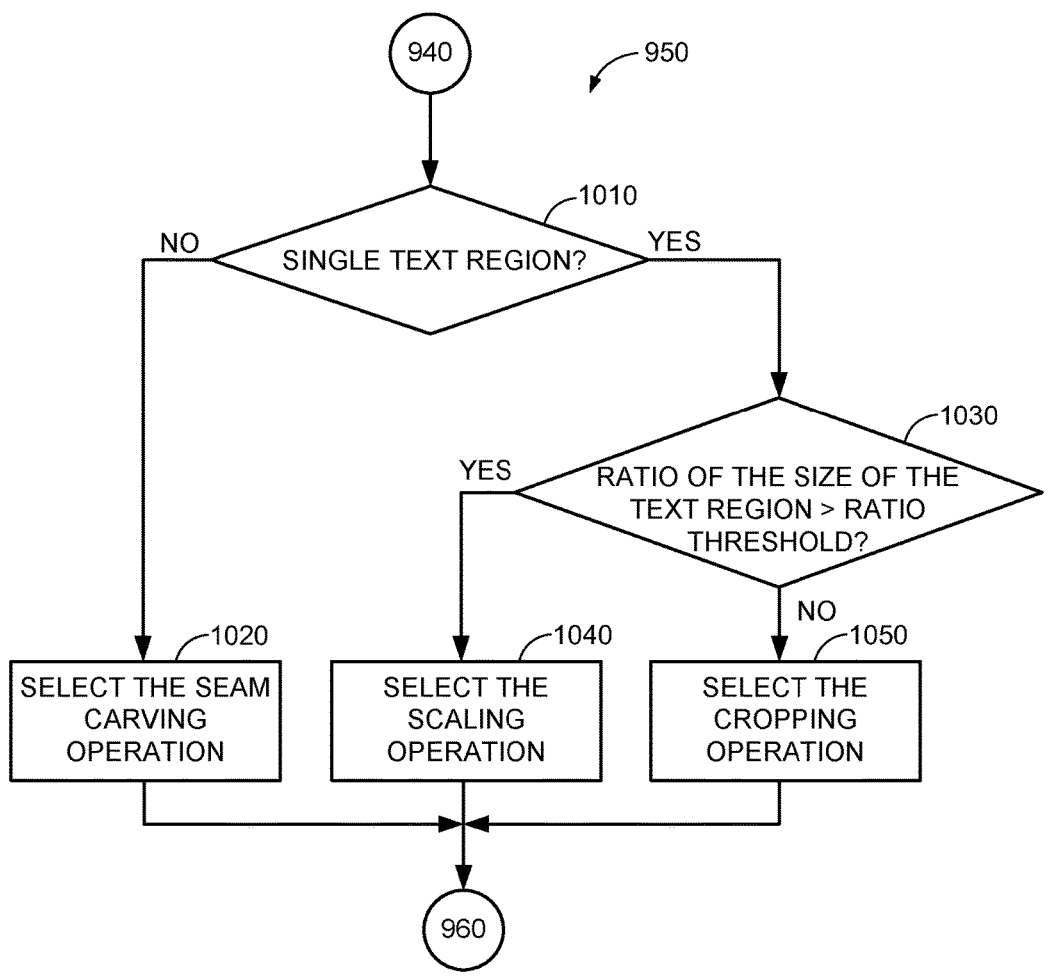
FIG. 10 illustrates a flowchart of a detailed method for selecting the image resizing operation based on the layout information, according to one embodiment of the present disclosure.

FIG. 10 illustrates a flowchart of a detailed method of 950 for selecting the image resizing operation based on the layout information, according to one embodiment of the present disclosure. Once the layout information is determined, at 940, the resizing operation selection unit 346 may determine whether the image has a single text region, at 1010. If it is determined that the image has a plurality of text regions (i.e., "NO" at 1010), the resizing operation selection unit 346 may select the seam carving operation, at 1020. In this case, the method may proceed to 960 so that the seam carving unit 350 may perform the seam carving operation on the image based on the size of the image, the layout information, and the target image size, at 960. In performing the seam carving operation, the seam carving unit 350 may resize the image to the target image size by removing a plurality of seams (e.g., paths of pixels) that are located in regions other than the text region in the image.

On the other hand, if it is determined that the image has a single text region (i.e., "YES" at 1010), the resizing operation selection unit 346 may determine whether a ratio of the size of the text region to the size of the image is larger than a ratio threshold (e.g., a predetermined ratio), at 1030. If the ratio of the text region is larger than the ratio threshold (i.e., "YES" at 1030), the resizing operation selection unit 346 may select the scaling operation, at 1040. Upon selecting the scaling operation, the method may proceed to 960 so that the scaling unit 354 may resize the image by performing the scaling operation on the image based on the size of the image, the layout information, and the target image size, at 960. In performing the scaling operation, the scaling unit 354 may determine a scaling direction and a scaling ratio for the image that are adapted to match the target image size and to preserve the size of the text region relative to other regions in the image.

Otherwise, if the ratio of the text region is smaller than or equal to the ratio threshold (i.e., "NO" at 1030), the resizing operation selection unit 346 may select the cropping operation, at 1050. When the cropping operation is selected, the method may proceed to 960 so that the cropping unit 352 may resize the image to the target image size by performing the cropping operation on the image based on the size of the image, the layout information, and the target image size, at 960. In the cropping operation, one or more portions outside the text region in the image may be selected and cropped to resize the image to match the target image size.

Figure 11:
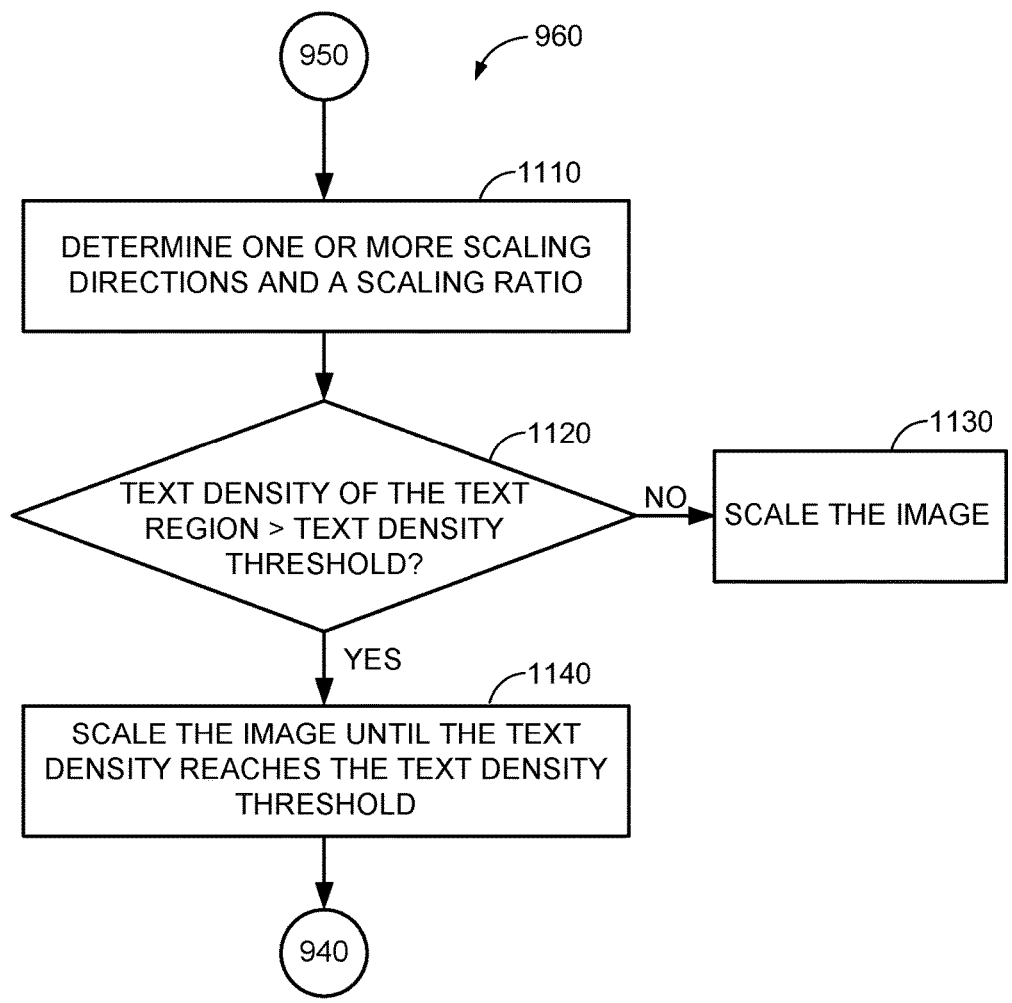
FIG. 11 illustrates a flowchart of a detailed method for resizing the image to the target image size by performing the scaling operation on the image, according to one embodiment of the present disclosure.

FIG. 11 illustrates a flowchart of a detailed method of 960 for resizing the image to the target image size by performing the scaling operation on the image, according to one embodiment of the present disclosure. When the resizing operation selection unit 346 selects the scaling operation, at 950, the scaling unit 354 may determine one or more scaling directions (e.g., a horizontal direction, a vertical direction, and a diagonal direction) and a scaling ratio, at 1110. In one embodiment, the one or more scaling directions and the scaling ratio may be determined based on the size of the image and the target image size.

Upon determining the scaling direction and the scaling ratio, the scaling unit 354 may determine whether the text density of the text region is larger than a text density threshold (e.g., a predetermined text density), at 1120. If the text density of the text region is determined to be smaller than or equal to the text density threshold (i.e., "NO" at 1120), the scaling unit 354 may scale the image to the target image size, at 1130. In one embodiment, the scaling unit 354 may sample and interpolate a plurality of pixels in the image using any suitable image scaling schemes such as bilinear interpolation, bicubic interpolation, nearest neighbor interpolation, and the like based on the scaling directions and the scaling ratio. If the text density of the text region is determined to be larger than the predetermined text density (i.e., "YES" at 1120), the scaling unit 354 may scale the image until the text density of the text region reaches the predetermined text density, at 1140. In this case, the method may proceed to 940 so that the scaling unit 354 may provide the scaled image of an interim image size to the layout information determination unit 344 for determining layout information on the interim image.

Figure 12:
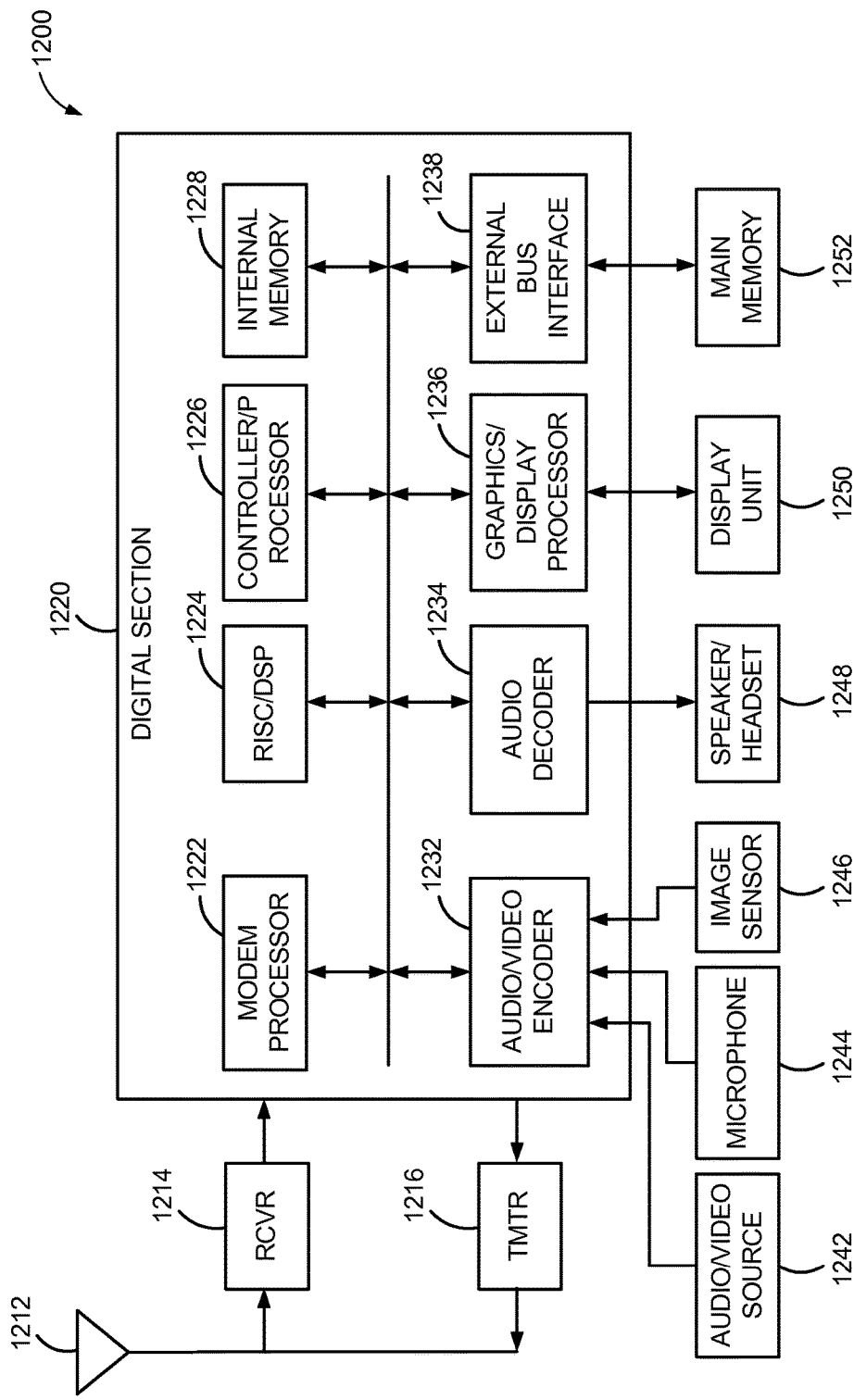
FIG. 12 is a block diagram of an exemplary electronic device in which the methods and apparatus for performing a function of a voice assistant unit in response to an activation keyword and a speech command in an input sound stream may be implemented according to some embodiments of the present disclosure.

FIG. 12 is a block diagram of an exemplary electronic device 1200 in which the methods and apparatus for selecting an image resizing operation for an image including at least one text portion and resizing the image based on the selected image resizing operation may be implemented according to some embodiments of the present disclosure. The configuration of the electronic device 1200 may be implemented in the electronic devices according to the above embodiments described with reference to FIGS. 1 to 11. The electronic device 1200 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 1200 may communicate directly with another mobile device, e.g., using Wi-Fi Direct or Bluetooth.

The electronic device 1200 is capable of providing bidirectional communication via a receive path and a transmit path. On the receive path, signals transmitted by base stations are received by an antenna 1212 and are provided to a receiver (RCVR) 1214. The receiver 1214 conditions and digitizes the received signal and provides samples such as the conditioned and digitized digital signal to a digital section for further processing. On the transmit path, a transmitter (TMTR) 1216 receives data to be transmitted from a digital section 1220, processes and conditions the data, and generates a modulated signal, which is transmitted via the antenna 1212 to the base stations. The receiver 1214 and the transmitter 1216 may be part of a transceiver that may support CDMA, GSM, LTE, LTE Advanced, etc.

The digital section 1220 includes various processing, interfaces, and memory units such as, for example, a modem processor 1222, a reduced instruction set computer/digital signal processor (RISC/DSP) 1224, a controller/processor 1226, an internal memory 1228, a generalized audio/video encoder 1232, a generalized audio decoder 1234, a graphics/display processor 1236, and an external bus interface (EBI) 1238. The modem processor 1222 may perform processing for data transmission and reception, e.g., encoding, modulation, demodulation, and decoding. The RISC/DSP 1224 may perform general and specialized processing for the electronic device 1200. The controller/processor 1226 may perform the operation of various processing and interface units within the digital section 1220. The internal memory 1228 may store data and/or instructions for various units within the digital section 1220.

The generalized audio/video encoder 1232 may perform encoding for input signals from an audio/video source 1242, a microphone 1244, an image sensor 1246, etc. The generalized audio decoder 1234 may perform decoding for coded audio data and may provide output signals to a speaker/headset 1248. The graphics/display processor 1236 may perform processing for graphics, videos, images, and texts, which may be presented to a display unit 1250. The EBI 1238 may facilitate transfer of data between the digital section 1220 and a main memory 1252.

The digital section 1220 may be implemented with one or more processors, DSPs, microprocessors, RISCs, etc. The digital section 1220 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blue-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

<Aspects of Present Disclosure>

Hereinafter, some aspects of the present disclosure will be additionally stated.

Example 1

According to an aspect of the present disclosure, there is provided a method, performed in an electronic device, for resizing an image having text, including: determining layout information of at least one text region in the image, wherein the layout information includes at least one of a number, a size, a location, a shape, or a text density of the at least one text region in the image; selecting at least one operation among a seam carving operation, a cropping operation, and a scaling operation for the image based on the layout information, a size of the image, and a target image size; and performing the selected operation to resize the image to the target image size based at least on one of the layout information, the size of the image, or the target image size, wherein the resized image includes the at least one text region.

Example 2

In the method of Example 1, determining the layout information includes: detecting a plurality of text portions in the image; and clustering at least one of the plurality of text portions into the at least one text region based at least on one of a stroke width, a size, a shape, or a location of the plurality of text portions.

Example 3

In the method of Example 1 or 2, determining the layout information of the at least one text region includes: recognizing text in the at least one text region in the image; and determining a priority for each of the at least one text region based on the recognized text in the at least one text region in the image.

Example 4

In the method of any one of Examples 1 to 3, determining the priority for each of the at least one text region includes determining at least one of a type of information or content of the text region based on the recognized text.

Example 5

In the method of any one of Examples 1 to 4, performing the selected operation to resize the image to the target image size includes: selecting a text region associated with a low priority from the at least one text region; and performing the selected operation to remove the selected text region from the image.

Example 6

In the method of any one of Examples 1 to 5, selecting the seam carving operation, the cropping operation, or the scaling operation includes selecting the seam carving operation in response to the layout information, wherein the layout information is indicative of a plurality of text regions in the image.

Example 7

In the method of any one of Examples 1 to 6, selecting the seam carving operation, the cropping operation, or the scaling operation includes selecting the seam carving operation, and wherein performing the selected operation includes: calculating a plurality of energy values for a plurality of pixels in the image, wherein an energy value of each of the pixels is indicative of a probability that the pixel is text; determining a plurality of seams in the image based on the energy values for the pixels in the image, each of the seams including a set of the plurality of pixels along a path of minimum energy gradient; and removing at least one of the seams from the image based on a sum of the energy values of the pixels in each of the seams in the image.

Example 8

In the method of any one of Examples 1 to 7, determining the layout information of the at least one text region includes: recognizing text in the at least one text region in the image; and determining a priority for each of the at least one text region based on the recognized text in the at least one text region in the image, and wherein calculating the plurality of energy values includes adjusting the energy values for the pixels associated with the at least one text region based on the priority for each of the at least one text region.

Example 9

In the method of any one of Examples 1 to 8, selecting the seam carving operation, the cropping operation, or the scaling operation includes selecting the cropping operation in response to the layout information indicating a single text region in the image, and wherein a size of the single text region is smaller than or equal to the target image size.

Example 10

In the method of any one of Examples 1 to 9, selecting the seam carving operation, the cropping operation, or the scaling operation includes selecting the scaling operation in response to the layout information indicating a single text region in the image, and wherein a size of the single text region is larger than the target image size.

Example 11

In the method of any one of Examples 1 to 10, performing the selected operation includes: performing the selected operation to resize the image to an interim image having a size larger than the target image size; and resizing the interim image to the target image size by performing at least one operation among the seam carving operation, the cropping operation, and the scaling operation other than the selected operation.

Example 12

According to another aspect of the present disclosure, there is provided an electronic device for resizing an image having text, including: a layout information determination unit configured to determine layout information of at least one text region in the image, wherein the layout information includes at least one of a number, a size, a location, a shape, or a text density of the at least one text region in the image; a resizing operation selection unit configured to select a seam carving operation, a cropping operation, or a scaling operation for the image based on the layout information, a size of the image, and a target image size; and a resizing unit configured to perform the selected operation to resize the image to the target image size based at least on one of the layout information, the size of the image, or the target image size, wherein the resized image includes the at least one text region.

Example 13

In the electronic device of Example 12, the resizing unit includes at least one of a seam carving unit, a cropping unit, or a scaling unit, wherein the seam carving unit is configured to perform the seam carving operation, wherein the cropping unit is configured to perform the cropping operation, and wherein the scaling unit is configured to perform the scaling operation.

Example 14

In the electronic device of Example 12 or 13, the electronic device further includes a text detection unit configured to detect a plurality of text portions in the image, wherein the layout information determination unit is configured to cluster at least one of the plurality of text portions into the at least one text region based at least on one of a stroke width, a size, a shape, or a location of the plurality of text portions.

Example 15

In the electronic device of any one of Examples 12 to 14, the layout information determination unit is configured to: recognize text in the at least one text region in the image; and determine a priority for each of the at least one text region based on the recognized text in the at least one text region in the image.

Example 16

In the electronic device of any one of Examples 12 to 15, the layout information determination unit is configured to determine at least one of a type of information or content of the text region based on the recognized text.

Example 17

In the electronic device of any one of Examples 12 to 16, the resizing unit is configured to: select a text region associated with a low priority from the at least one text region; and perform the selected operation to remove the selected text region from the image.

Example 18

In the electronic device of any one of Examples 12 to 17, the resizing operation selection unit is configured to select the seam carving operation in response to the layout information, wherein the layout information is indicative of a plurality of text regions in the image.

Example 19

In the electronic device of any one of Examples 12 to 18, the resizing operation selection unit selects the seam carving operation, and wherein the seam carving unit is configured to: calculate a plurality of energy values for a plurality of pixels in the image, wherein an energy value of each of the pixels is indicative of a probability that the pixel is text; determine a plurality of seams in the image based on the energy values for the pixels in the image, each of the seams including a set of the plurality of pixels along a path of minimum energy gradient; and remove at least one of the seams from the image based on a sum of the energy values of the pixels in each of the seams in the image.

Example 20

In the electronic device of any one of Examples 12 to 19, the layout information determination unit is configured to: recognize text in the at least one text region in the image; and determine a priority for each of the at least one text region based on the recognized text in the at least one text region in the image, and wherein the seam carving unit is configured to adjust the energy values for the pixels associated with the at least one text region based on the priority for each of the at least one text region.

Example 21

In the electronic device of any one of Examples 12 to 20, the resizing operation selection unit is configured to select the cropping operation in response to the layout information indicating a single text region in the image, and wherein a size of the single text region is smaller than or equal to the target image size.

Example 22

In the electronic device of any one of Examples 12 to 21, the resizing operation selection unit is configured to select the scaling operation in response to the layout information indicating a single text region in the image, and wherein a size of the single text region is larger than the target image size.

Example 23

According to still another aspect of the present disclosure, there is provided an electronic device for resizing an image having text, including means for determining layout information of at least one text region in the image, wherein the layout information includes at least one of a number, a size, a location, a shape, or a text density of the at least one text region in the image; means for selecting at least one operation among a seam carving operation, a cropping operation, and a scaling operation for the image based on the layout information, a size of the image, and a target image size; and means for performing the selected operation to resize the image to the target image size based at least on one of the layout information, the size of the image, or the target image size, wherein the resized image includes the at least one text region.

Example 24

In the electronic device of Example 23, the electronic device further includes the means for detecting a plurality of text portions in the image, wherein the means for determining the layout information is configured to cluster at least one of the plurality of text portions into the at least one text region based at least on one of a stroke width, a size, a shape, or a location of the plurality of text portions.

Example 25

In the electronic device of Example 23 or 24, the means for determining the layout information is configured to: recognize text in the at least one text region in the image; and determine a priority for each of the at least one text region based on the recognized text in the at least one text region in the image.

Example 26

In the electronic device of any one of Example 23 to 25, the means for selecting the seam carving operation, the cropping operation, or the scaling operation for the image selects the seam carving operation, wherein the means for performing the selected operation is configured to: calculate a plurality of energy values for a plurality of pixels in the image, wherein an energy value of each of the pixels is indicative of a probability that the pixel is text; determine a plurality of seams in the image based on the energy values for the pixels in the image, each of the seams including a set of the plurality of pixels along a path of minimum energy gradient; and remove at least one of the seams from the image based on a sum of the energy values of the pixels in each of the seams in the image.

Example 27

According to yet another aspect of the present disclosure, there is provided a non-transitory computer-readable storage medium including instructions for resizing an image having text in an electronic device, the instructions causing a processor of the electronic device to perform the operations of: determining layout information of at least one text region in the image, wherein the layout information includes at least one of a number, a size, a location, a shape, or a text density of the at least one text region in the image; selecting at least one operation among a seam carving operation, a cropping operation, and a scaling operation for the image based on the layout information, a size of the image, and a target image size; and performing the selected operation to resize the image to the target image size based at least on one of the layout information, the size of the image, or the target image size, wherein the resized image includes the at least one text region.

Example 28

In the non-transitory computer-readable storage medium of Example 27, determining the layout information includes: detecting a plurality of text portions in the image, and clustering at least one of the plurality of text portions into the at least one text region based at least on one of a stroke width, a size, a shape, or a location of the plurality of text portions.

Example 29

In the non-transitory computer-readable storage medium of Example 27 or 28, determining the layout information of the at least one text region includes: recognizing text in the at least one text region in the image; and determining a priority for each of the at least one text region based on the recognized text in the at least one text region in the image.

Example 30

In the non-transitory computer-readable storage medium of any one of Examples 27 to 29, selecting the seam carving operation, the cropping operation, or the scaling operation includes selecting the seam carving operation, and wherein performing the selected operation includes: calculating a plurality of energy values for a plurality of pixels in the image, wherein an energy value of each of the pixels is indicative of a probability that the pixel is text; determining a plurality of seams in the image based on the energy values for the pixels in the image, each of the seams including a set of the plurality of pixels along a path of minimum energy gradient; and removing at least one of the seams from the image based on a sum of the energy values of the pixels in each of the seams in the image.

What is claimed:

1. A method, performed in an electronic device, for resizing an image having text, the method comprising:
    determining, by a processor in the electronic device, layout information of at least one text region in the image, wherein the layout information comprises a determined quantitative value indicating the number of text regions in the image;
    selecting at least one operation from the group consisting of a seam carving operation, a cropping operation, and a scaling operation for the image based on the layout information, a size of the image, and a target image size; and
    performing the selected at least one operation to resize the image to the target image size based on at least one of the layout information, the size of the image, or the target image size, wherein the resized image comprises the text regions.

2. The method of claim 1, wherein:
    the at least one operation is selected based on the determined quantitative value included in the layout information, and
    the electronic device comprises a mobile communication device.

3. The method of claim 1, wherein the image comprises one or more non-text regions, wherein the layout information comprises a size and a shape of the at least one text region, and wherein determining the layout information comprises:
    recognizing at least a portion of the text in a text region of the at least one text region; and
    determining a priority for the text region based on the recognized text.

4. The method of claim 3, further comprising determining at least one of a type of information or content of the text region based on the recognized at least a portion of the text, wherein the priority for the text region is based on the at least one of the type of information or the content of the text region.

5. The method of claim 1, further comprising:
    selecting a text region associated with a low priority from the at least one text region; and
    performing at least one operation to remove the selected text region from the image.

6. The method of claim 1, wherein determining the layout information comprises:
    detecting a plurality of text portions in the image, the plurality of text portions comprising at least a portion of the text; and
    clustering at least one of the plurality of text portions into the at least one text region based on at least one of a stroke width, a size, or a shape of the plurality of text portions.

7. The method of claim 1, wherein:
    in response to the layout information indicating multiple text regions in the image:
        the seam carving operation is selected; and
        performing the selected at least one operation comprises:
            calculating a plurality of energy values for a plurality of pixels in the image, wherein an energy value of each of the pixels is indicative of a probability that the pixel is text;
            determining a plurality of seams in the image based on the plurality of energy values, each of the plurality of seams including comprising a set of the plurality of pixels along a path of minimum energy gradient; and
            removing at least one of the plurality of seams from the image based on a sum of energy values of pixels in each of the plurality of seams,
    in response to the layout information indicating a single text region in the image and that a size of the single text region is smaller than or equal to the target image size, the cropping operation is selected, and
    in response to the layout information indicating the single text region and that the size of the single text region is larger than the target image size, the scaling operation is selected.

8. The method of claim 1, wherein determining the layout information comprises:
    recognizing at least a portion of the text in a text region of the at least one text region;
    determining at least one of a type of information or content of the text region based on the recognized portion of the text;
    determining a priority of the text region based on the at least one of the type of information or the content of the text region; and
    adjusting energy values for pixels associated with the at least one text region based on a corresponding priority for each of the at least one text region.

9. The method of claim 1, wherein the electronic device comprises a fixed location communication unit, and wherein performing the selected at least one operation comprises:
    resizing the image to an interim image having a size larger than the target image size; and
    resizing the interim image to the target image size by performing at least one operation from the group consisting of the seam carving operation, the cropping operation, and the scaling operation other than the selected at least one operation.

10. An electronic device for resizing an image having text, the electronic device comprising:
    at least one of an antenna, a receiver configured to receive an encoded signal, or a display screen; and
    a processor coupled to one or more of the antenna, the receiver, or the display screen, the processor configured to:
        determine layout information of at least one text region in the image, wherein the layout information comprises a counted quantitative value indicating the number of text regions in the image;
        determine, from the group consisting of a seam carving operation, a cropping operation, and a scaling operation, at least one selected operation for the image based on the layout information, a size of the image, and a target image size; and
        perform the at least one selected operation to resize the image to the target image size based on at least one of the layout information, the size of the image, or the target image size, wherein the resized image comprises the text regions.

11. The electronic device of claim 10, wherein the image comprises one or more non-text regions, wherein the layout information further comprises a size and a shape of the at least one text region, and wherein the processor is further configured to:
　recognize at least a portion of the text in a text region of the at least one text region;
　determine at least one of a type of information or content of the text region based on the recognized text;
　determine a priority of the text region based on the at least one of the type of information or the content of the text region;
　select the text region from the at least one text region in response to determining that the text region is associated with a low priority; and
　perform at least one operation to remove the selected text region from the image.

12. The electronic device of claim 10, wherein the processor is further configured to:
　detect a plurality of text portions in the image; and
　cluster at least one of the plurality of text portions into the at least one text region based on at least one of a stroke width, a size, a shape, or a location of the plurality of text portions.

13. The electronic device of claim 10, wherein the processor is further configured to:
　recognize at least a portion of the text in a text region of the at least one text region; and
　determine a priority for the text region based on the recognized text.

14. The electronic device of claim 13, wherein the processor is further configured to determine at least one of a type of information or content of the text region based on the recognized text.

15. The electronic device of claim 13, wherein the processor is further configured to:
　select the text region from the at least one text region in response to determining that the text region is associated with a low priority; and
　perform at least one operation to remove the selected text region from the image.

16. The electronic device of claim 10, wherein the at least one selected operation comprises:
　the seam carving operation in response to the layout information indicating that the image comprises a plurality of text regions;
　the cropping operation in response to the layout information indicating that the image comprises a single text region and that a size of the single text region is smaller than or equal to the target image size; and
　the scaling operation in response to the layout information indicating that the image comprises the single text region and that the size of the single text region is larger than the target image size.

17. The electronic device of claim 10, wherein the processor is further configured to perform the seam carving operation by:
　calculating a plurality of energy values for a plurality of pixels in the image, wherein an energy value of each of the plurality of pixels is indicative of a probability that the pixel is text;
　determining a plurality of seams in the image based on the plurality of energy values, each of the plurality of seams comprising a set of the plurality of pixels along a path of minimum energy gradient; and
　removing at least one of the plurality of seams from the image based on a sum of energy values of pixels in each of the plurality of seams.

18. The electronic device of claim 17, wherein the processor is further configured to:
　recognize at least a portion of the text in a text region of the at least one text region; and
　determine a particular priority for the text region based on the recognized text,
　wherein the seam carving operation is configured to adjust the plurality of energy values for based on a priority for each of the at least one text region.

19. The electronic device of claim 10, wherein the receiver is coupled to the antenna and configured to receive an encoded signal.

20. The electronic device of claim 19, wherein the processor, the receiver, and the antenna are integrated into a mobile communication device.

21. The electronic device of claim 19, wherein the processor, the receiver, and the antenna are integrated into a fixed location communication unit.

22. An apparatus comprising:
　means for determining layout information of at least one text region in an image, wherein the layout information comprises a counted quantitative value indicating the number of text regions in the image;
　means for selecting at least one operation from the group consisting of a seam carving operation, a cropping operation, and a scaling operation for the image, the means for selecting configured to select the at least one operation based on the layout information, a size of the image, and a target image size; and
　means for performing the selected at least one operation to resize the image to the target image size based on at least one of the layout information, the size of the image, or the target image size, wherein the resized image comprises the text regions.

23. The apparatus of claim 22, wherein the means for determining is configured to:
　recognize text in a text region of the at least one text region; and
　determine a priority for the text region based on the recognized text.

24. The apparatus of claim 22, further comprising means for detecting a plurality of text portions in the image, wherein:
　the means for determining is configured to cluster at least one of the plurality of text portions into the at least one text region based on at least one of a stroke width, a size, a shape, or a location of the plurality of text portions, and
　the means for performing is configured to, in response to the selected at least one operation comprising the seam carving operation:
　　calculate a plurality of energy values for a plurality of pixels in the image, wherein an energy value of each of the pixels is indicative of a probability that the pixel is text;
　　determine a plurality of seams in the image based on the plurality of energy values, each of the plurality of seams comprising a set of the plurality of pixels along a path of minimum energy gradient; and
　　remove at least one of the plurality of seams from the image based on a sum of energy values of pixels in each of the plurality of seams.

25. The apparatus of claim 22, wherein the means for determining, the means for selecting, and the means for performing are integrated into a mobile communication device.

26. The apparatus of claim 22, wherein the means for determining, the means for selecting, and the means for performing are integrated into a fixed location communication unit.

27. A non-transitory computer-readable storage medium comprising instructions that, when executed by a processor, cause the processor to perform operations comprising:
    determining layout information of at least one text region in an image, wherein the layout information comprises a counted quantitative value indicating the number of text regions in the image;
    selecting at least one operation from the group consisting of a seam carving operation, a cropping operation, and a scaling operation for the image based on the layout information, a size of the image, and a target image size; and
    performing the selected at least one operation to resize the image to the target image size based on at least one of the layout information, the size of the image, or the target image size, wherein the resized image comprises the text regions.

28. The non-transitory computer-readable storage medium of claim 27, wherein determining the layout information comprises:
    detecting a plurality of text portions in the image, and
    clustering at least one of the plurality of text portions into the at least one text region based on at least one of a stroke width, a size, a shape, or a location of the plurality of text portions.

29. The non-transitory computer-readable storage medium of claim 27, wherein determining the layout information comprises:
    recognizing text in a text region of the at least one text region; and
    determining a priority for the text region based on the recognized text.

30. The non-transitory computer-readable storage medium of claim 27, wherein performing the selected at least one operation comprises, in response to selection of the seam carving operation:
    calculating a plurality of energy values for a plurality of pixels in the image, wherein an energy value of each of the plurality of pixels is indicative of a probability that the pixel is text;
    determining a plurality of seams in the image based on the plurality of energy values, each of the plurality of seams comprising a set of the plurality of pixels along a path of minimum energy gradient; and
    removing at least one of the plurality of seams from the image based on a sum of energy values of pixels in each of the plurality of seams.

* * * * *